(12) United States Patent
Arita et al.

(10) Patent No.: US 7,175,929 B2
(45) Date of Patent: Feb. 13, 2007

(54) FUEL CELL, METHOD OF MANUFACTURING THE SAME, AND FUEL CELL STACK INCLUDING THE SAME

(75) Inventors: Takashi Arita, Shinagawa (JP); Michiko Endo, Shinagawa (JP); Hiroto Inoue, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 578 days.

(21) Appl. No.: 10/625,681

(22) Filed: Jul. 24, 2003

(65) Prior Publication Data
US 2004/0131907 A1 Jul. 8, 2004

(30) Foreign Application Priority Data
Nov. 25, 2002 (JP) ............................. 2002-340900
Dec. 19, 2002 (JP) ............................. 2002-368519

(51) Int. Cl.
*H01M 8/10* (2006.01)
*H01M 4/86* (2006.01)

(52) U.S. Cl. ...................... 429/30; 429/32; 429/40; 429/44; 429/127; 29/623.4

(58) Field of Classification Search ................ 429/30, 429/32, 40, 44, 127
See application file for complete search history.

(56) References Cited

U.S. PATENT DOCUMENTS 4,510,213 A * 4/1985 Schnacke .................... 429/36
6,602,632 B2 * 8/2003 Wakahoi et al. ............. 429/35
6,699,593 B2 * 3/2004 Kaneta et al. ............... 428/670
2004/0028994 A1 * 2/2004 Akikusa et al. ............. 429/44

FOREIGN PATENT DOCUMENTS

| JP | 11-26005 | 1/1999 |
|---|---|---|
| JP | 2001-283892 | 10/2001 |
| JP | 2001-297779 | 10/2001 |
| JP | 2002-15763 | 1/2002 |
| JP | 2002-63917 | 2/2002 |
| JP | 2002-110191 | 4/2002 |
| JP | 2002-216803 | 8/2002 |

* cited by examiner

*Primary Examiner*—Dah-Wei Yuan
*Assistant Examiner*—Karie O'Neill
(74) *Attorney, Agent, or Firm*—Staas & Halsey LLP

(57) ABSTRACT

A fuel cell includes: a membrane electrode assembly (MEA) including a polyelectrolyte membrane having first and second sides to which a fuel electrode and an air electrode are joined, respectively; a fuel electrode housing having an internal face on which a fuel channel and a fuel-side electrode film are formed; and an air electrode housing having an air passage formed therein, the air electrode housing having an internal face on which an air-side electrode film is formed. The fuel electrode housing is joined to the MEA with the internal face thereof facing the fuel electrode of the MEA so that the fuel-side electrode film is electrically connected to the fuel electrode. The air electrode housing is joined to the MEA with the internal face thereof facing the air electrode of the MEA so that the air-side electrode film is electrically connected to the air electrode.

24 Claims, 20 Drawing Sheets

FUEL CELL, METHOD OF MANUFACTURING THE SAME, AND FUEL CELL STACK INCLUDING THE SAME

BACKGROUND OF THE INVENTION

1. Field of the Invention

The present invention relates to a fuel cell, a method of manufacturing the same, and a fuel cell stack including the same.

2. Description of the Related Art

As mobile apparatuses such as portable personal computers, mobile phones, and portable game machines have improved in their performance and functions, there has been an increasing demand for an increase in their battery capacity.

For instance, in recent years and continuing, the mobile phones tend to consume more and more power due to larger display screens, the addition of a moving image display function, and the provision of W-CDMA next-generation mobile phone services.

Currently, lithium secondary cells are widely used in these apparatuses. In these lithium secondary cells, however, more than 90% of the storage capacity of their electrode material is already being utilized. Further, it is believed that for safety reasons, the energy density of lithium secondary cells cannot be increased beyond approximately 450 Wh/L. Therefore, no significant increase can be expected in their unit storage capacity.

Under these circumstances, efforts have been dedicated to the research and development of small-size fuel cells as next-generation energy devices that can be expected to have extremely high unit storage capacity.

The direct methanol fuel cell (DMFC) is one of various types of small-size fuel cells.

The DMFC generates hydrogen by decomposing methanol used as fuel in the presence of a catalyst provided to a fuel electrode, and causes the generated hydrogen to react with oxygen, thereby generating power. The DMFC can realize energy density approximately ten times that of lithium ion-based cells. Further, unlike methanol reforming-type fuel cells, the DMFC does not require a reformer for decomposing methanol. Therefore, the DMFC can be easily reduced in size and weight, and can be used for a long period.

A description is given below, with reference to FIG. 1, of a conventional DMFC as disclosed in Japanese Laid-Open Patent Application No. 2001-283892. FIG. 1 is a sectional view of a cell pack composed of a plurality of DMFCs 1. The layer components of the cell pack are shown spaced for convenience of description.

Each DMFC 1 includes a proton exchange membrane (PEM) 2 and a fuel electrode (a catalyst layer) 3a and an air electrode (a catalyst layer) 3b joined to the respective sides of the PEM 2. Each of the fuel electrode 3a and the air electrode 3b is formed of carbon paper and holds a catalyst thereon. Metal-mesh collectors (collector plates) 4a and 4b are provided to the fuel electrode 3a and the air electrode 3b, respectively, on the side opposite to the PEM 2. A separate conductive member (not shown in the drawing) is electrically connected to each of the collectors 4a and 4b to be extended outward. Reference numeral 5 denotes channels for airflow.

In this case, the above-described DMFCs 1 are connected in series by an electric connection member 6. The connected DMFCs 1 are sandwiched between upper and lower end plates 7 and 8. The end plates 7 and 8 are fastened to each other by screws (not shown in the drawing). Thus, the DMFCs 1 are integrated into the single cell pack. A fuel inlet 7a and a fuel outlet are formed in the end plate 7. The fuel outlet, which is positioned behind the fuel inlet 7a in FIG. 1, is not graphically represented. An air supply hole 8a is formed in the end plate 8. Reference numeral 9 denotes a flow prevention member for preventing fuel from entering the air electrode 3b side.

If the conductive members of a constant thickness connected to the collectors 4a and 4b or the collectors 4a and 4b themselves are directly extended outside the seal part of the main body of the DMFC 1, fuel leakage may be caused due to sealing deficiency. Therefore, fastening members formed of conductive material are attached through the seal part, or actually, through a housing covering the main body of the DMFC 1 including the seal part, to the conductive members or the collectors 4a and 4b provided inside the seal part. The fastening members function as extension electrodes. Each fastening member is also attached with a seal structure.

In the DMFC 1, a methanol aqueous solution is supplied as fuel to the fuel electrode 3a. The solution comes into contact with the catalyst of the fuel electrode 3a so that methanol and water in the solution react with each other to be converted to protons (hydrogen ions) and carbon dioxide. The generated protons pass through the PEM 2 to reach the air electrode 3b. Then, the protons react with oxygen included in the air supplied to the air electrode 3b in the presence of its catalyst, and are converted to water. Electrons are generated by the reaction in the fuel electrode 3a, and are consumed by the reaction in the air electrode 3b. These electrons flow from the collector 4a into the collector 4b through a load (not shown in the drawing). As a result, power is generated to be supplied to the load.

SUMMARY OF THE INVENTION

However, since the above-described conventional DMFC 1 is assembled by superimposing the PEM 2, the fuel electrode 3a, the air electrode 3b, the collectors 4a and 4b, and the end plates 7 and 8, the collector 4a or 4b may come into insufficient contact with the fuel electrode 3a or the air electrode 3b, depending on the assembly condition or structure, to do damage to the power generation function of the DMFC 1 or cause fuel leakage from the DMFC 1. Further, the production cost of the DMFC 1 is kept high due to a large number of components.

Further, each component of the DMFC 1 has a predetermined thickness so as to set a limit to the reduction of the DMFC 1 in thickness and size.

Furthermore, since the extension electrodes cannot be extended directly from inside the seal part of the main body of the DMFC 1, the DMFC 1 has a complicated electrode extension structure for extending the extension electrodes.

Accordingly, it is a general object of the present invention to provide a fuel cell in which the above-described disadvantages are eliminated, a method of manufacturing the same, and a fuel cell stack including the same.

A more specific object of the present invention is to provide a fuel cell having a reduced probability of fuel leakage and a reduced number of components, a method of manufacturing the same, and a fuel cell stack including the same.

Another more specific object of the present invention is to provide a fuel cell having a reduced probability of damage occurring to its power generation function, a method of manufacturing the same, and a fuel cell stack including the same.

Yet another more specific object of the present invention is to provide a fuel cell having a simple electrode extension structure, and a fuel cell stack including the same.

The above objects of the present invention are achieved by a fuel cell including: a membrane electrode assembly (MEA) including a polyelectrolyte membrane having first and second sides to which a fuel electrode and an air electrode are joined, respectively; a fuel electrode housing having an internal face on which a fuel channel and a fuel-side electrode film are formed; and an air electrode housing having an air passage formed therein, the air electrode housing having an internal face on which an air-side electrode film is formed, wherein the fuel electrode housing is joined to the MEA with the internal face thereof facing the fuel electrode of the MEA so that the fuel-side electrode film is electrically connected to the fuel electrode, and the air electrode housing is joined to the MEA with the internal face thereof facing the air electrode of the MEA so that the air-side electrode film is electrically connected to the air electrode.

According to the above-described fuel cell, the fuel-side and air-side electrode layers, which are collectors, are formed integrally with the fuel electrode housing and the air electrode housing, respectively. Therefore, compared with the conventional fuel cell where the collectors are provided separately from the fuel electrode housing and the air electrode housing, the probability of fuel leakage is reduced. Further, compared with the conventional fuel cell, the number of components is reduced in the above-described fuel cell, so that the production cost thereof can be reduced.

The above objects of the present invention are also achieved by a fuel cell stack including a plurality of fuel cells according to the present invention, wherein each fuel cell has a first extension electrode electrically connected to the fuel-side electrode film of the fuel electrode housing and exposed therefrom through an opening, and a second extension electrode electrically connected to the air-side electrode film of the air electrode housing and exposed therefrom through an opening, and the first extension electrode of a first one of the fuel cells is electrically connected by an engagement member to the second extension electrode of a second one of the fuel cells adjacent to the first one of the fuel cells, the engagement member engaging the openings through which the first and second extension electrodes are exposed, respectively.

According to the above-described fuel cell stack, the electrical connection of the fuel cells and the physical connection and fixation of the fuel cells can be achieved simultaneously by the engagement member.

The above objects of the present invention are also achieved by a method of manufacturing a fuel cell according to the present invention, the method including the steps of (a) providing a metal wire between the edge part of the fuel electrode housing and the edge part of the air electrode housing, and (b) welding the edge parts of the fuel electrode housing and the air electrode housing together by heating the metal wire by causing an electric current to flow therethrough.

According to the above-described method, it can be ensured that fuel leakage from the fuel cell is prevented from occurring.

The above objects of the present invention are also achieved by a fuel cell including a membrane electrode assembly (MEA) including a polyelectrolyte membrane having first and second sides to which a fuel electrode and an air electrode are joined, respectively, and a flexible substrate having a pair of first and second conductor layers formed on a side thereof, wherein the flexible substrate is folded to hold the MEA between the first and second conductor layers opposing each other so that the first and second conductor layers are connected to the fuel electrode and the air electrode, respectively, of the MEA.

In the above-described fuel cell, the thin flexible substrate on which the conductor layers serving as collectors are formed is employed. Therefore, in assembling the fuel cell, at the time of sealing the inside of the fuel cell by a packing holding the members of the fuel cell including the substrate, the sealing can be ensured. Further, the fuel cell can be reduced in thickness and size compared with the conventional fuel cell.

The above objects of the present invention are further achieved by a fuel cell stack including a plurality of connected fuel cells each including a membrane electrode assembly (MEA) including a polyelectrolyte membrane having first and second sides to which a fuel electrode and an air electrode are joined, respectively, and a flexible substrate having a plurality of pairs of conductor layers formed on a side thereof, the pairs corresponding in number to the fuel cells, wherein the flexible substrate is folded to hold each MEA between the corresponding pair of conductor layers opposing each other so that the conductor layers are connected to the fuel and air electrodes, respectively, of the MEA.

The above-described fuel cell stack achieves reduction in thickness and size, compared with the conventional fuel cell stack, with the sealing of the inside of each fuel cell being ensured.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention. The following embodiments are based on a DMFC.

[First Embodiment]

First, a description is given below, with reference to FIGS. 2 through 6, of a fuel cell 10 according to a first embodiment of the present invention.

Figure 1:
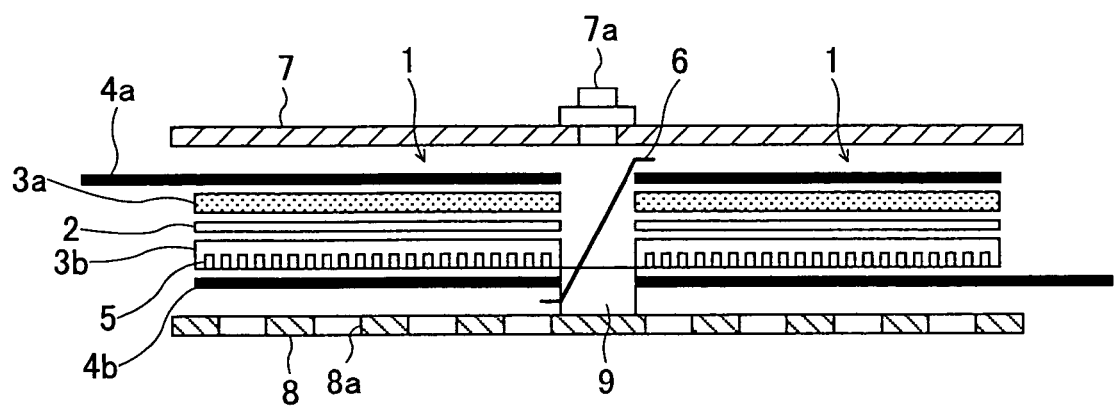
FIG. 1 is a sectional view of a cell pack composed of a plurality of conventional DMFCs.
Figure 2:
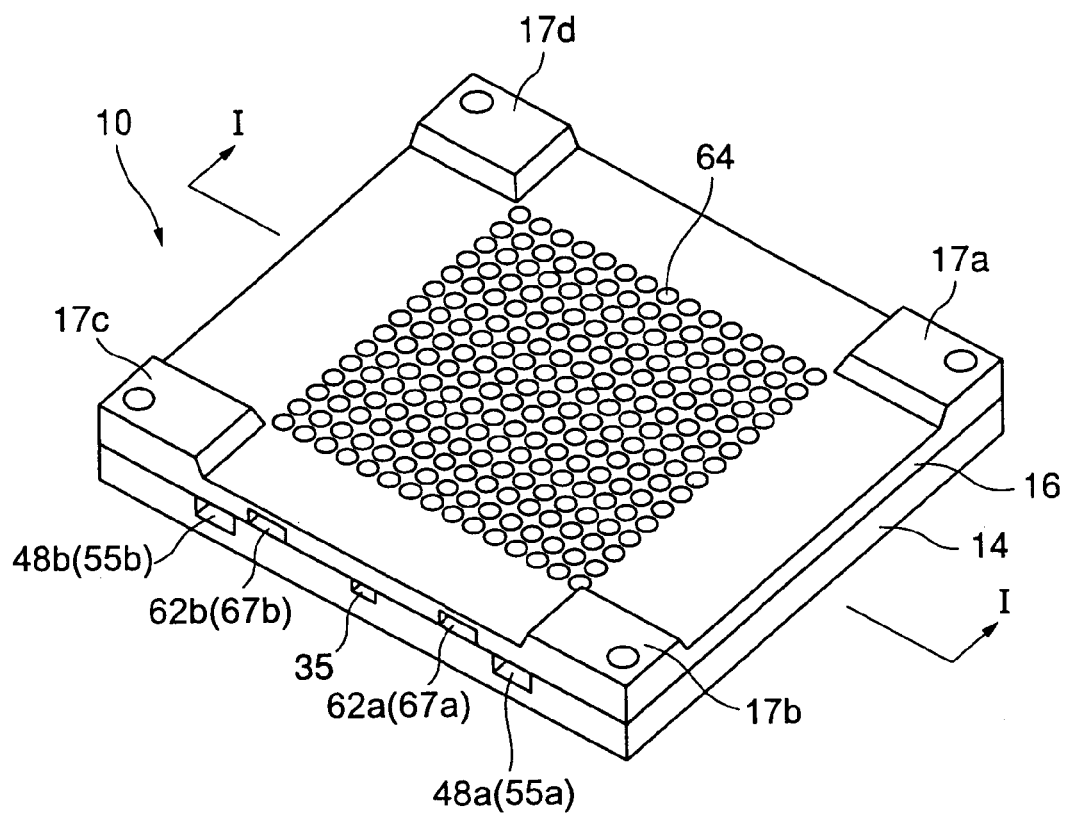
FIG. 2 is a perspective view of a fuel cell in an assembled state according to a first embodiment of the present invention.
Figure 3:
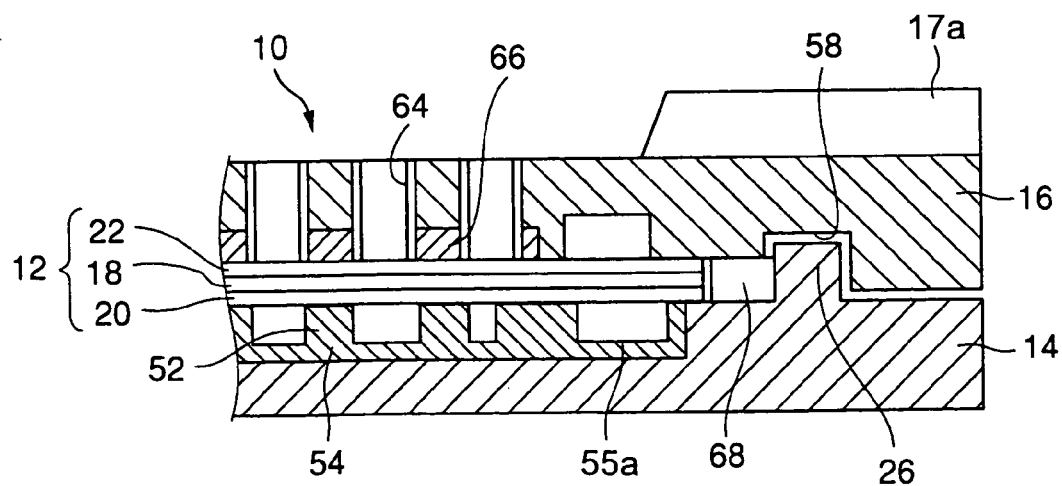
FIG. 3 is a sectional view of the fuel cell of FIG. 2 taken along the line I—I according to the first embodiment of the present invention.

FIG. 2 is a perspective view of the fuel cell 10 in an assembled state, and FIG. 3 is a sectional view of the fuel cell 10 of FIG. 2 taken along the line I—I. Referring to FIGS. 2 and 3, the fuel cell 10 includes a membrane electrode assembly (MEA) 12, a fuel electrode housing 14, and an air electrode housing 16.

Figure 4:
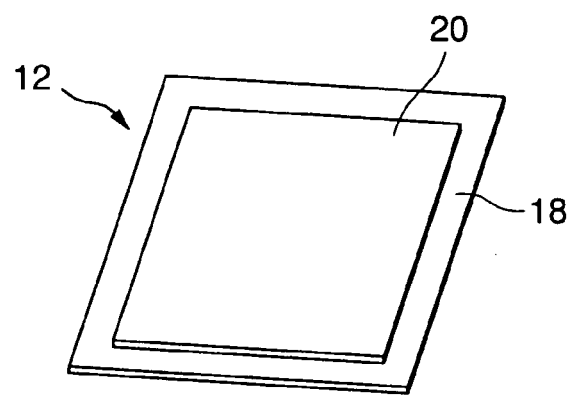
FIG. 4 is a perspective view of a membrane electrode assembly (MEA) of the fuel cell according to the first embodiment of the present invention.

FIG. 4 is a perspective view of the MEA 12. The MEA 12 includes a fluorine-based polyelectrolyte membrane 18, and a fuel electrode 20 and an air electrode 22 formed of carbon paper, the fuel electrode 20 and the air electrode 22 being joined to the respective sides of the polyelectrolyte membrane 18. The side of the fuel electrode 20 which side is joined to the polyelectrolyte membrane 18 is coated with carbon holding a Pt/Ru catalyst. On the other hand, the side of the air electrode 22 which side is joined to the polyelectrolyte membrane 18 is coated with carbon holding a Pt catalyst. The fuel electrode 20 and the air electrode 22 are bonded to the polyelectrolyte membrane 18 by hot pressing, for instance, thereby ensuring that the catalyst layers of the fuel electrode 20 and the air electrode 22 come into contact with the polyelectrolyte membrane 18.

Figure 5:
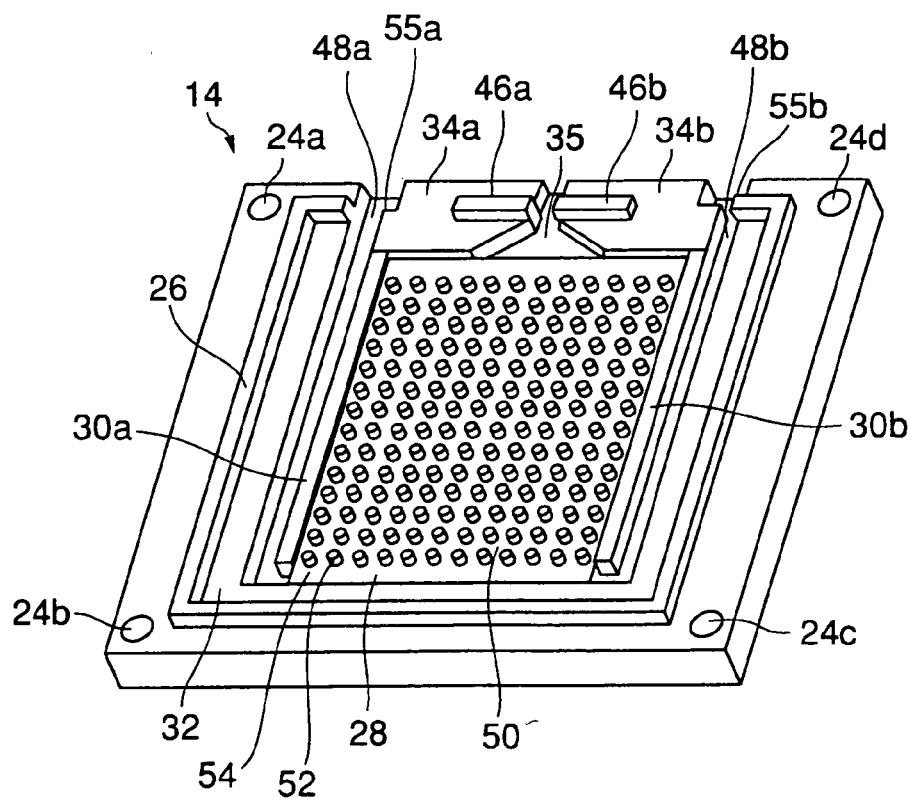
FIG. 5 is a perspective view of a fuel electrode housing of the fuel cell according to the first embodiment of the present invention.

FIG. 5 is a perspective view of the fuel electrode housing 14. The fuel electrode housing 14 is a plate member formed of material such as PBT by molding, for instance. The face of the fuel electrode housing 14 on the side opposing the fuel electrode 20 (hereinafter referred to as internal face) in the assembled state of the fuel cell 10 is processed.

That is, referring to FIG. 5, screw holes 24a through 24d are formed in the four corners of the fuel electrode housing 14. A substantially three-sided projecting frame body part 26 is formed inside the positions of the screw holes 24a through 24d on the edge part of the internal face of the fuel electrode housing 14. A large rectangular recess 28 is formed inside the frame body part 26, and linear projections 30a and 30b are formed in the recess 28 so as to oppose each other (see FIG. 5). A later-described packing 68 (FIG. 3) is provided on a flat part 32 formed between the frame body part 26 and the recess 28. Flat parts 34a and 34b having the same height as the flat part 32 are formed in the part of the fuel electrode housing 14 on its upper side (see FIG. 5) which part is not surrounded by the frame body part 26. The flat parts 34a and 34b are separated from the frame body part 26. The shape of the flat part 34a is a mirror image of the shape of the flat part 34b. A groove part 35 is formed between the flat parts 34a and 34b so that its width increases toward the center of the recess 28. The groove part 35 serves as an outlet for below-described $CO_2$. Linear projections 46a and 46b having the same height as the frame body part 26 are formed on the upper faces of the flat parts 34a and 34b, respectively.

A fuel supply channel 48a is formed in the recess 28 between the flat part 32 and the flat part 34a and between the flat part 32 and the linear projection 30a. A fuel supply channel 48b is formed in the recess 28 between the flat part 32 and the flat part 34b and between the flat part 32 and the linear projection 30b. A fuel reaction chamber 50 to be filled with fuel is formed between the linear projections 30a and 30b in the recess 28 so as to communicate with the fuel supply channels 48a and 48b. Due to this configuration, the fuel reaction chamber 50 can be evenly supplied with fuel through the two fuel supply channels 48a and 48b. In other words, the fuel electrode 20 can be evenly supplied with fuel.

A metal electrode layer (fuel-side electrode film) 54 is formed on the surface of each of the fuel reaction chamber 50 and the fuel supply channels 48a and 48b. The metal electrode layer 54 has a multitude of minute cylindrical projections 52 (a metal member) in the fuel reaction chamber 50. The top of each projection 52 is positioned substantially on a plane level with the flat part 32 of the fuel electrode housing 14. The metal electrode layer 54 is formed, for instance, by plating electroless Ni plating (undercoat) with Au. At this point, the projections 52 are formed integrally with the fuel electrode housing 14 when the fuel electrode housing 14 is formed by molding. Therefore, the metal electrode layer 54 is also formed on the surface of each projection 52. Thus, the metal electrode layer 54 is formed with excellent adhesiveness to the fuel reaction chamber 50 and the fuel supply channels 48a and 48b. The part of the metal electrode layer 54 formed on the fuel supply channel 48a and the part of the metal electrode layer 54 formed on the fuel supply channel 48b serve as extension electrodes (of the negative pole) 55a and 55b, respectively.

Figure 6:
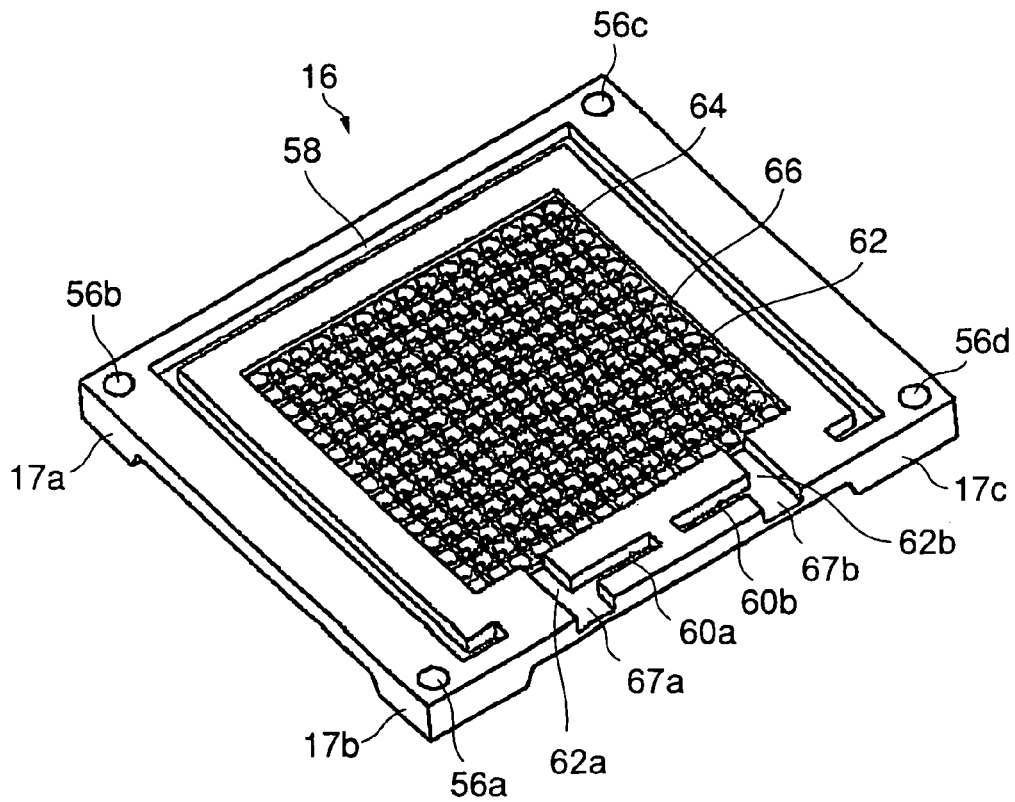
FIG. 6 is a perspective view of an air electrode housing of the fuel cell according to the first embodiment of the present invention.

FIG. 6 is a perspective view of the air electrode housing 16. The air electrode housing 16 is a plate member formed of material such as PBT by molding, for instance. Rectangular projections 17a through 17d are formed in the four corners of the face of the air electrode housing 16 which face is opposite to the face (internal face) opposing the air electrode 22 in the assembled state of the fuel cell 10. Due to this configuration, in the assembled state of a below-described fuel cell stack 188 (see FIG. 20), the adjacent fuel cells 10 are separated by the projections 17a through 17d so as to have a space formed therebetween, thereby preventing vent holes 64 from being closed by the adjacent fuel cell 10.

On the other hand, the internal face of the air electrode housing 16 is processed. That is, referring to FIG. 6, screw holes 56a through 56d corresponding to the screw holes 24a through 24d of the fuel electrode housing 14 are formed in the four corners of the air electrode housing 16. Inside the positions of the screw holes 56a through 56d on the edge part of the internal face of the air electrode housing 16, a groove 58 is formed so as to fit with the frame body part 26 of the fuel electrode housing 14, and grooves 60a and 60b are formed so as to fit with the linear projections 46a and 46b of the fuel electrode housing 14.

A large rectangular recess 62 is formed in the center of the internal face of the air electrode housing 16 as the recess 28 is formed in the fuel electrode housing 14. The recess 62 serves as an air reaction chamber 62. The vent holes 64 are formed as a multitude of minute holes in the air reaction chamber 62. Due to this configuration, a below-described metal electrode layer (air-side electrode film) 66, or the air reaction chamber 62, or the air electrode 22, can be evenly supplied with air. Grooves 62a and 62b are formed next to the grooves 60a and 60b, respectively, so as to communicate with the recess 62.

The metal electrode layer 66 is formed on the surface of each of the air reaction chamber 62 and the grooves 62a and 62b. The metal electrode layer 66 is formed, for instance, by plating electroless Ni plating with Au. As a result, the metal electrode layer 66 is formed with excellent adhesiveness to the air reaction chamber 62 and the grooves 62a and 62b. The part of the metal electrode layer 66 formed on the groove 62a and the part of the metal electrode layer 66 formed on the groove 62b serve as extension electrodes (of the positive pole) 67a and 67b, respectively.

In assembling the above-described parts including the MEA 12 into the fuel cell 10, first, the fuel electrode housing 14 is placed with its internal face facing upward, and the packing 68 formed of material such as rubber is provided on the flat part 32. Then, the MEA 12 is provided inside the packing 68 on the fuel electrode housing 14 so that the fuel electrode 20 of the MEA 12 faces the fuel electrode housing 14. Next, the air electrode housing 16 is provided on the MEA 12, with the internal face of the air electrode housing 16 facing the MEA 12, so that the frame body part 26 and the linear projections 46a and 46b are fitted into the groove 58 and the grooves 60a and 60b, respectively. Finally, screw members (not shown in the drawings) are inserted into the screw holes 24a through 24d and 56a through 56d and tightened, so that the fuel electrode housing 14 and the air electrode housing 16 are fastened. The edge parts of the fuel electrode housing 14 and the air electrode housing 16 are sealed, for instance, by ultrasonic welding. Thus, the fuel cell 10 is fabricated.

The action of the fuel cell 10 is equal to that of the conventional fuel cell, and a description thereof is omitted to avoid repetition. In the fuel cell 10, the $CO_2$ generated by the reaction of methanol with water is ejected from the groove part 35. This reduces the probability of failure in fuel supply which failure may be caused by residual $CO_2$ in the fuel reaction chamber 50. In this case, a filter for removing $CO_2$ may be connected to the groove part 35.

Further, it is ensured that the fuel reaction chamber 50 is sealed, so that there is no possibility of fuel leakage.

When the fuel cell 10 is in an assembled state, the projections 52 of the metal electrode layer 54 press the MEA 12 so that the MEA 12 comes into contact with the metal electrode layer 66. This ensures that the metal electrode layer 54 comes into contact with the fuel electrode 20 and the metal electrode layer 66 comes into contact with the air electrode 22. As a result, electricity can be collected satisfactorily. Therefore, the degradation of the power generation function of the fuel cell 10 due to poor electrical connection can be prevented, so that high power generation efficiency can be achieved.

According to the fuel cell 10 of the first embodiment, the metal electrode layers 54 and 66, which are collectors, are formed integrally with the fuel electrode housing 14 and the air electrode housing 16, respectively. Therefore, compared with the conventional fuel cell where the collectors are provided separately from the fuel electrode housing and the air electrode housing, the probability of fuel leakage is reduced in the fuel cell 10. Further, compared with the conventional fuel cell, the number of components is reduced in the fuel cell 10, so that the production cost of the fuel cell 10 can be reduced.

In the fuel cell 10 of this embodiment, the metal electrode layers 54 and 66 are formed by wet plating, which may be replaced by a dry plating technique such as sputtering, vapor deposition, or ion plating. Further, the metal electrode layers 54 and 66 may also be formed using a coating technique such as printing or spray coating.

Next, a description is given of variations of the fuel cell 10 according to this embodiment. In the following variations, the same elements as those of the fuel cell 10 are referred to by the same numerals, and a description thereof is omitted. Further, graphical representation thereof may also be omitted.

First, a description is given below, with reference to FIGS. 7 and 8, of a first variation of the fuel cell 10.

A fuel electrode housing 14a and an air electrode housing 16a of the first variation are basically equal in configuration to the fuel electrode housing 14 and the air electrode housing 16, respectively, of the fuel cell 10.

The fuel electrode housing 14a and the air electrode housing 16a include metal electrode layers 54a and 66a that are different from the metal electrode layers 54 and 66 of the fuel electrode housing 14 and the air electrode housing 16, respectively.

Figure 7:
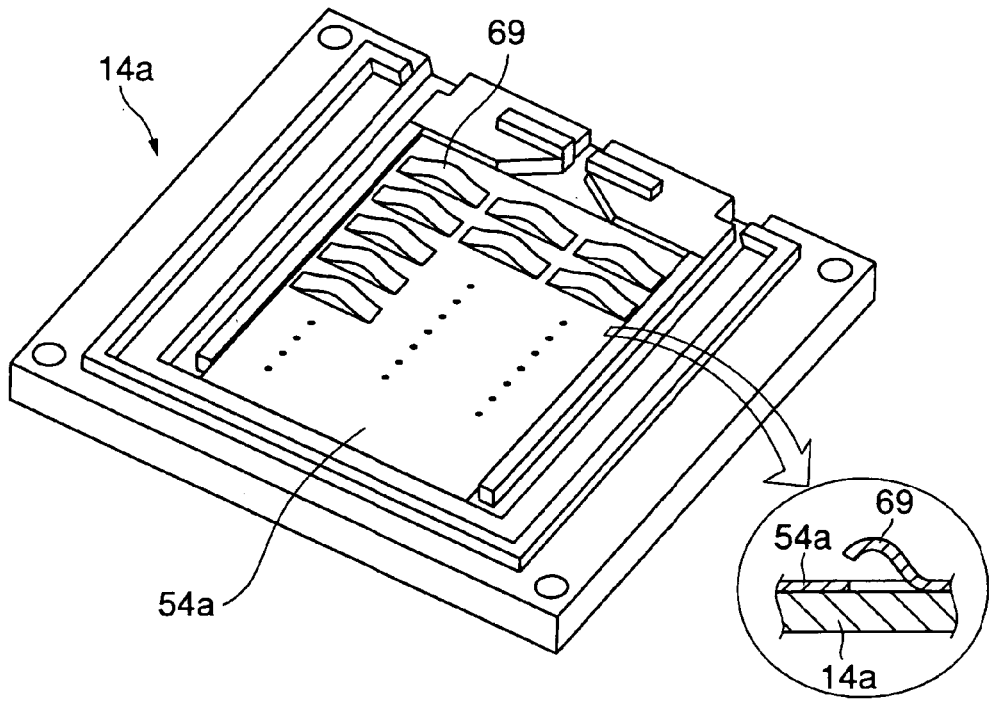
FIG. 7 is a perspective view of a fuel electrode housing of a first variation of the fuel cell according to the first embodiment of the present invention.
Figure 8:
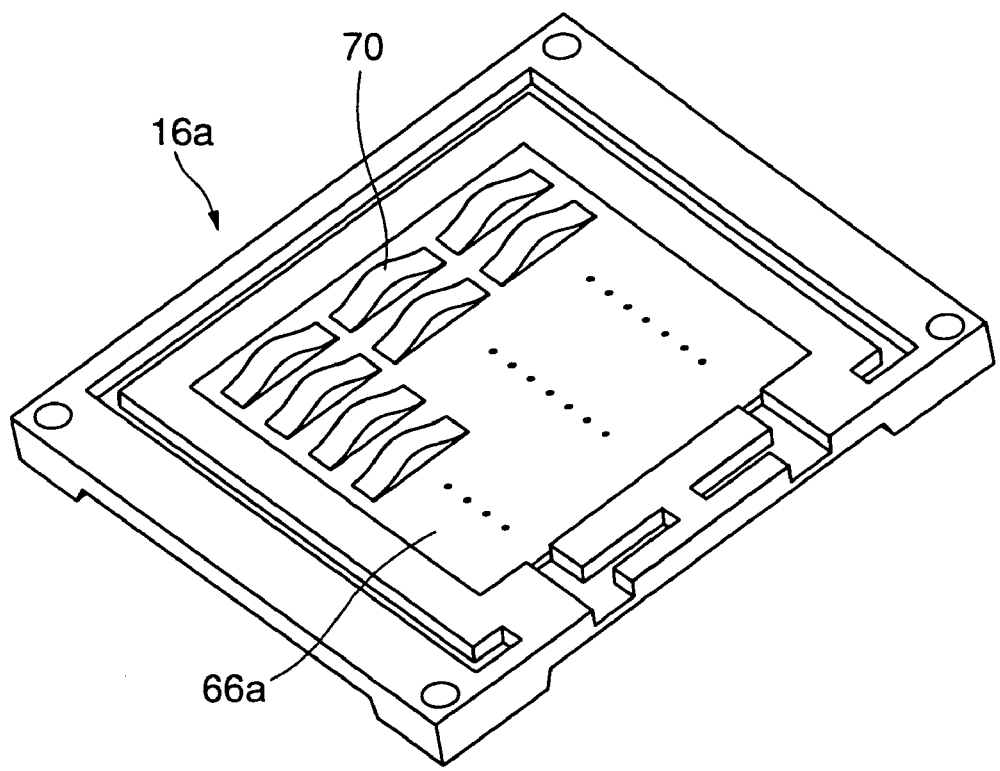
FIG. 8 is a perspective view of an air electrode housing of the first variation of the fuel cell according to the first embodiment of the present invention.

Each of the metal electrode layers 54a and 66a are formed by making cuts in a rectangular thin metal plate so that numerous curved strips are raised as leaf spring-like spring parts 69 or 70 (a metal member) as shown in FIG. 7 or 8. The spring parts 69 may be formed like coil springs. The metal electrode layer 54a on which the spring parts 69 are formed and the metal electrode layer 66a on which the spring parts 70 are formed are inserted in the fuel electrode housing 14a and the air electrode housing 16a, respectively, to be formed integrally therewith when the fuel electrode housing 14a and the air electrode housing 16a are molded. The highest portions of the spring parts 69 and 70 are positioned higher than the upper faces of the fuel electrode housing 14a and the air electrode housing 16a, respectively. Each of the metal electrode layers 54a and 66a is formed so that a predetermined area thereof is exposed from the corresponding fuel or air electrode housing 14a or 16a.

In the first variation of the fuel cell 10, the spring parts 69 and 70 formed on the metal electrode layers 54a and 66a press both sides of the MEA 12 so that the MEA 12 is held therebetween. This ensures the electrical connection of the metal electrode layers 54a and 66a with the MEA 12, so that the power generation efficiency can be increased.

Figure 9:
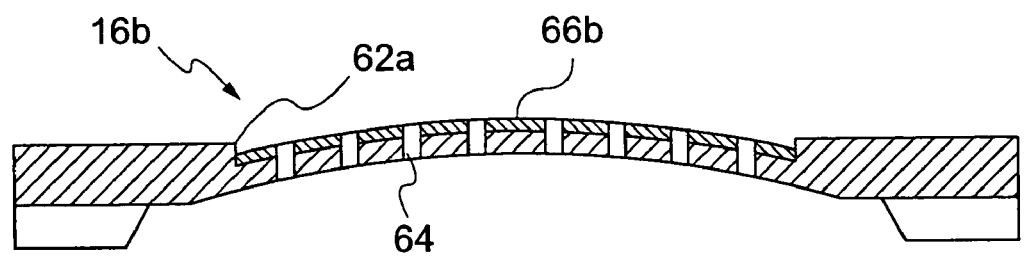
FIG. 9 is a sectional view of an air electrode housing of a second variation of the fuel cell according to the first embodiment of the present invention.

A description is given, with reference to FIG. 9, of a second variation of the fuel cell 10.

An air electrode housing 16b of the second variation has an air reaction chamber 62a formed to have a curved convex shape. Accordingly, a metal electrode layer 66b formed in the air reaction chamber 62a also has a curved convex shape. The highest portion of the metal electrode layer 66b in its center is formed on a plane level with the upper face of the air electrode housing 16b, for instance. Likewise, although not graphically represented, the fuel reaction chamber and the metal electrode layer of the fuel electrode housing of the second variation are also formed to have curved convex shapes.

In the assembled state of the second variation of the fuel cell 10, the projecting center parts of the metal electrode layers press the MEA 12 from both sides thereof even if the fastening forces of the screws in the edge parts of the fuel electrode housing and the air electrode housing (16b) do not reach the center parts of the housings. This ensures the electrical connection between the metal electrode layers and the MEA 12.

Figure 10:
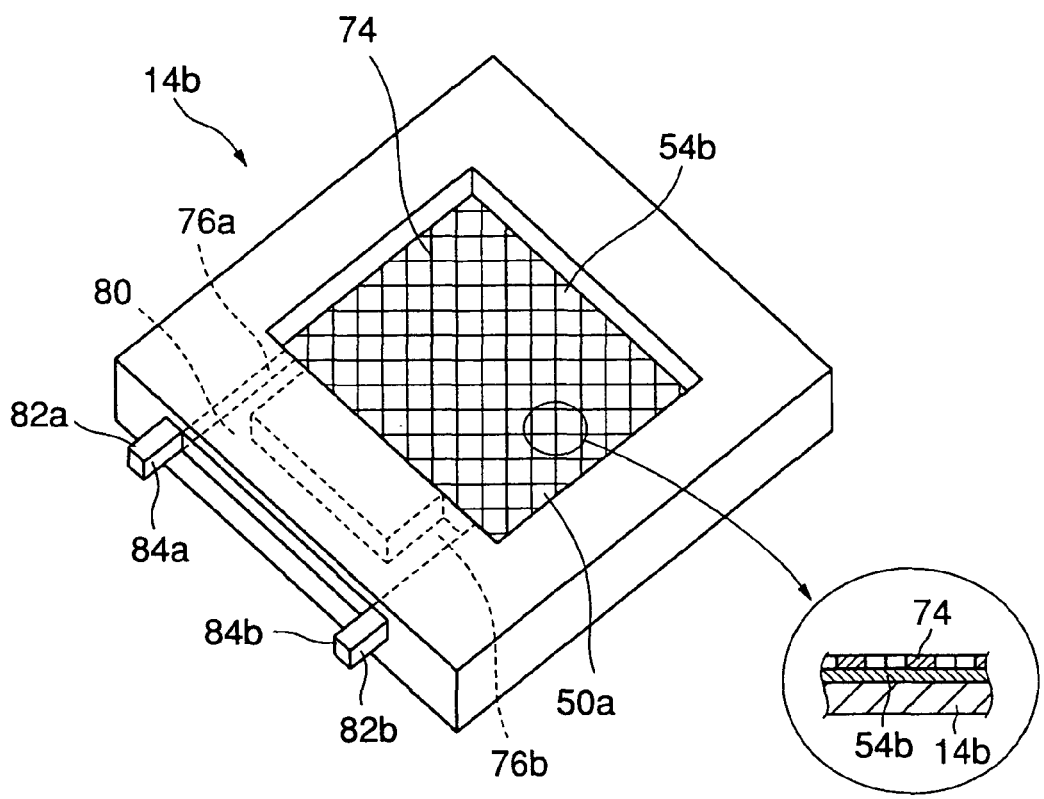
FIG. 10 is a perspective view of a fuel electrode housing of a third variation of the fuel cell according to the first embodiment of the present invention.

Next, a description is given, with reference to FIG. 10, of a third variation of the fuel cell 10.

A fuel electrode housing 14b of the third variation differs from the above-described fuel electrode housings 14 and 14a in the configuration of the metal electrode layer and the configuration of the fuel supply channels.

That is, in the fuel electrode housing 14b, a metal electrode layer 54b is provided in a fuel reaction chamber 50a that is a recess formed on one side of the fuel electrode housing 14b, and a metal mesh 74 (a metal member) is provided on the metal electrode layer 54b. In the fuel electrode housing 14b, two fuel supply channels 76a and 76b are formed on one side of the fuel reaction chamber 50a so as to connect the fuel reaction chamber 50a to the outside of the fuel electrode housing 14b. Further, a fuel reservoir 80 having an opening to the outside of the fuel electrode housing 14b is formed to communicate with the fuel supply channels 76a and 76b. Projections 82a and 82b are formed at both ends of the opening (fuel inlet) of the fuel reservoir 80. Part of the metal electrode layer 54b is extended to cover both sidewalls of the fuel reservoir 80 and the opposing walls of the projections 82a and 82b as extension electrodes (electric channels) 84a and 84b.

The metal electrode layer 54b on which the metal mesh 74 is provided, the fuel supply channels 76a and 76b, the fuel reservoir 80, and the extension electrodes 84a and 84b are formed by inserting a metal mesh processed to a predetermined shape in the fuel electrode housing 14b and performing insert molding thereon.

In the assembled state of the third variation of the fuel cell 10, the metal mesh 74 of the fuel electrode housing 14b is in contact with the fuel electrode 20. This ensures the electrical connection between the fuel electrode 20 and the metal electrode layer 54b. Further, the extension electrodes 84a and 84b, which project from the sidewall of the fuel electrode housing 14b, facilitate wiring.

Figure 11:
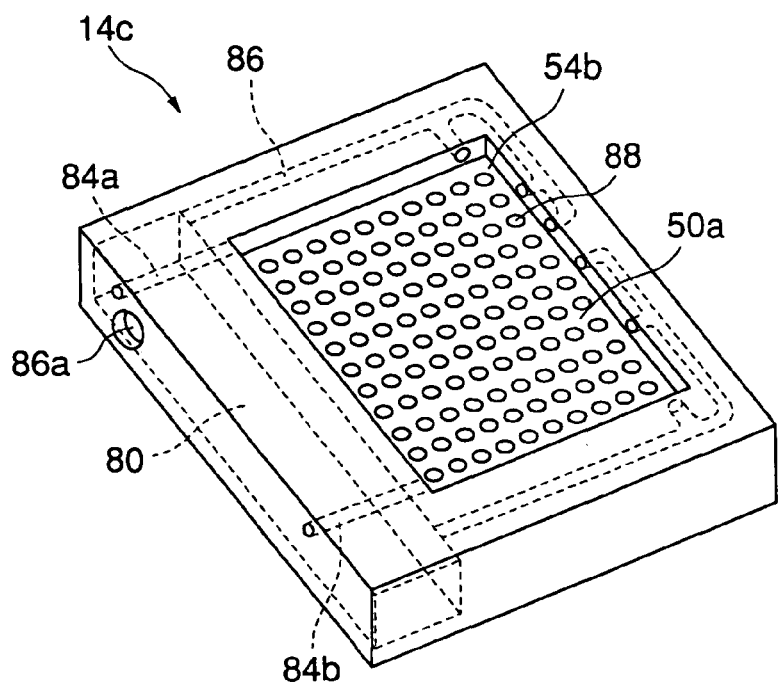
FIG. 11 is a perspective view of a fuel electrode housing of a fourth variation of the fuel cell according to the first embodiment of the present invention.
Figure 12A:
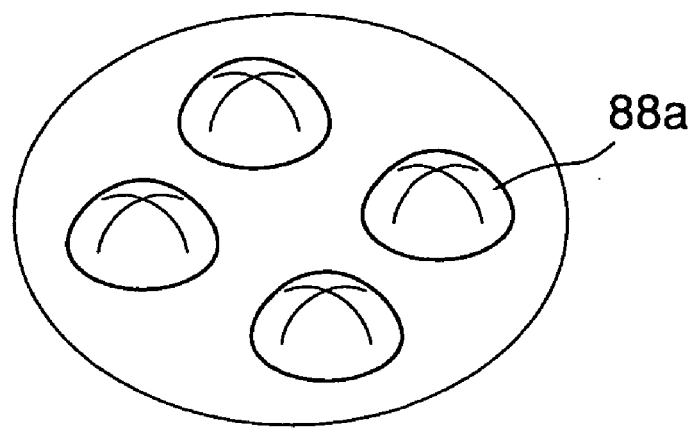
FIGS. 12A and 12B are diagrams showing variations of projections of the fuel electrode housing of FIG. 11 according to the first embodiment of the present invention.
Figure 12B:
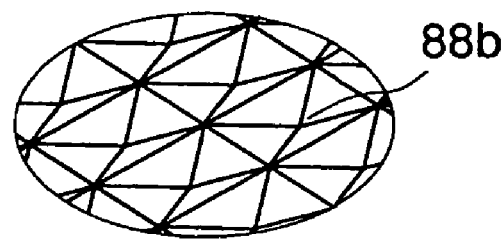

Next, a description is given, with reference to FIG. 11 and FIGS. 12A and 12B, of a fourth variation of the fuel cell 10.

A fuel electrode housing 14c of the fourth variation has basically the same configuration as the fuel electrode housing 14b of the third variation. The fuel electrode housing 14c differs from the fuel electrode housing 14b in that the opening of the fuel reservoir 80 is closed except for a fuel inlet 86a and that a fuel supply channel 86 extends from the fuel reservoir 80 to go along both sides of the fuel reaction chamber 50a so as to communicate therewith at a plurality of points on the side opposite to the fuel inlet 86a. This configuration allows the fuel reaction chamber 50a to be evenly supplied with fuel.

Further, instead of the metal mesh 74, numerous projections 88 are formed on the metal electrode layer 54b. The projections 88 may be hemispheric (dome-shaped) projections 88a as shown in FIG. 12A or quadrangular pyramid-like projections 88b as shown in FIG. 12B.

Figure 13:
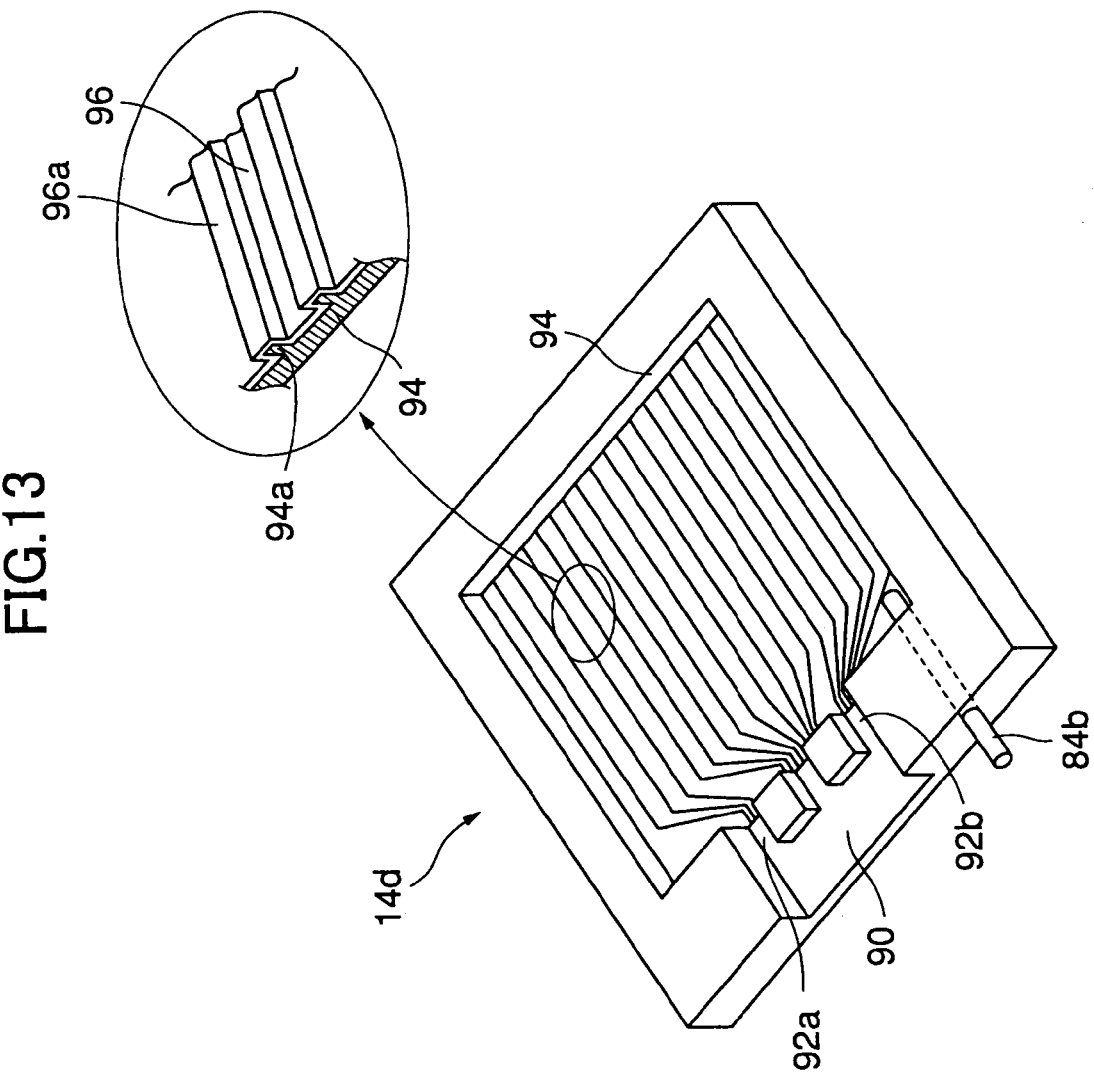
FIG. 13 is a perspective view of a fuel electrode housing of a fifth variation of the fuel cell according to the first embodiment of the present invention.

Next, a description is given, with reference to FIG. 13, of a fifth variation of the fuel cell 10.

A fuel electrode housing 14d of the fifth variation includes a fuel reservoir 90 and fuel supply channels 92a and 92b communicating therewith that are formed to have concave shapes. Further, numerous linear projections 94a are formed to extend in parallel toward the fuel supply channels 92a and 92b in a fuel reaction chamber 94 of the fuel electrode housing 14d. The fuel electrode housing 14d having the above-described shape is formed by molding, for instance. Electroless plating is performed on the entire surface of the fuel reaction chamber 94 including the linear projections 94a so that a metal electrode layer 96 including numerous linear projections 96a is formed.

In the fifth variation of the fuel cell 10, fuel is distributed between the linear projections 94a so that the entire fuel reaction chamber 94 is evenly supplied with fuel. The linear projections 94a may be formed to have a fine width and a fine space between each pair of adjacent linear projections 94a by a micromachining technology called MEMS (Micro Electro Mechanical System) so as to realize fuel penetration through capillarity.

Each of the above-described third through fifth variations of the fuel cell 10 may have an air electrode housing that has the same structure as the fuel electrode housing (14b, 14c, or 14d) of the same variation or any of the other variations.

Figure 14:
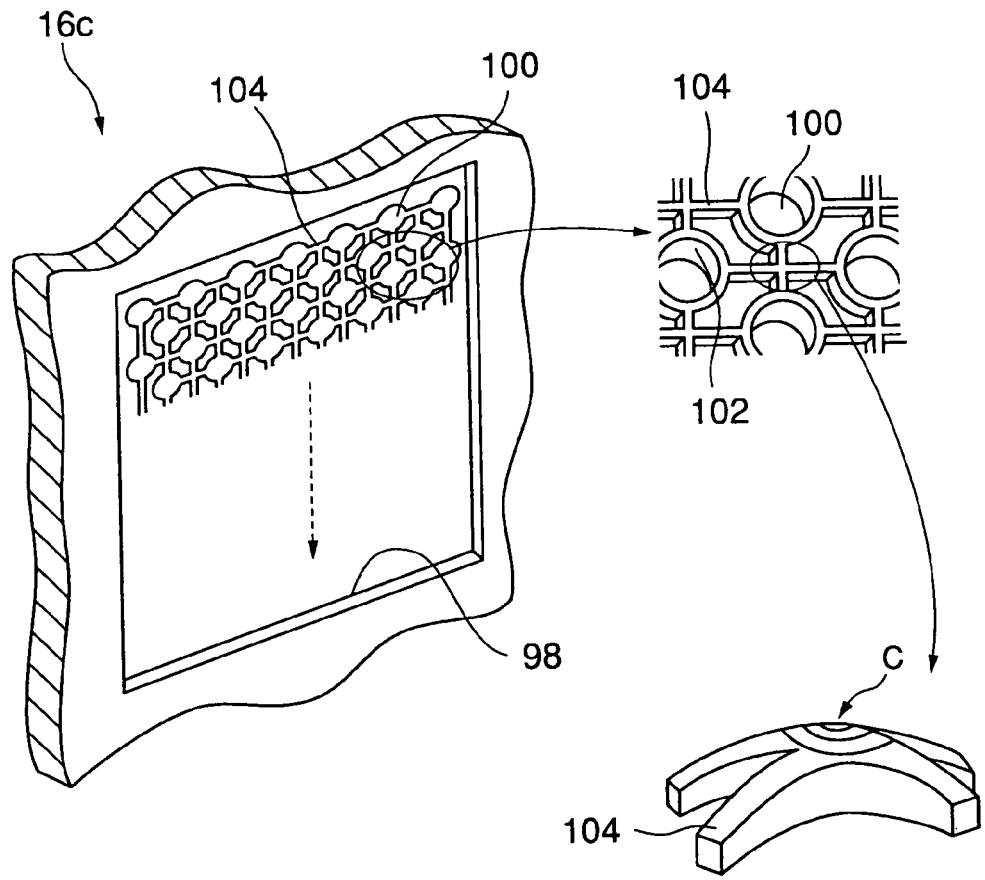
FIG. 14 is a diagram showing part of an air electrode housing of a sixth variation of the fuel cell according to the first embodiment of the present invention.

Next, a description is given, with reference to FIG. 14, of a sixth variation of the fuel cell 10.

In an air electrode housing 16c of the sixth variation, numerous vent holes 100 penetrating through an air reaction chamber 98 are arranged in a zigzag pattern. This arrangement allows the vent holes 100 to be provided at high density so that the entire air reaction chamber 98 can be evenly supplied with air. A projection part 102 is formed over the vent holes 100 to cover the entire surface of the air reaction chamber 98 like a grid. Electroless plating is performed on the projection part 102 so that a grid-like metal electrode layer 104 is formed. An intersection (indicated by arrow C in FIG. 14) of the grid of the projection part 102, or the metal electrode layer 104, may be formed like a dome. At this point, the projection part 102 may be formed by MEMS to have fine meshes.

Figure 15:
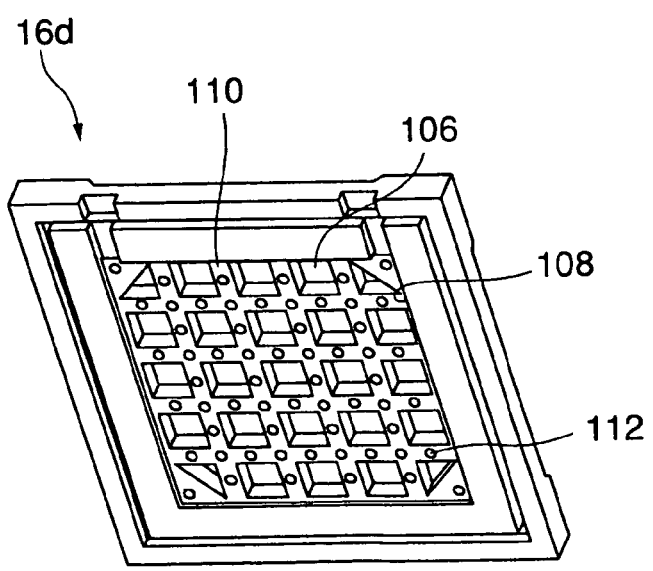
FIG. 15 is a perspective view of an air electrode housing of a seventh variation of the fuel cell according to the first embodiment of the present invention.

Next, a description is given, with reference to FIG. 15, of a seventh variation of the fuel cell 10.

An air electrode housing 16d of the seventh variation of the fuel cell 10 includes vent holes 106 that are formed like square poles and provided in a matrix-like arrangement. In the air electrode housing 16d, a metal electrode layer 110 is formed over the entire surface of an air reaction chamber 108 except for the vent holes 106. Fine-shaped projections 112 (a metal member) are formed between the adjacent vent holes 106 on the metal electrode layer 110.

Each of the above-described sixth and seventh variations of the fuel cell 10 may have a fuel electrode housing that has the same structure as the air electrode housing (16c or 16d) of the same variation or the other variation.

Figure 16:
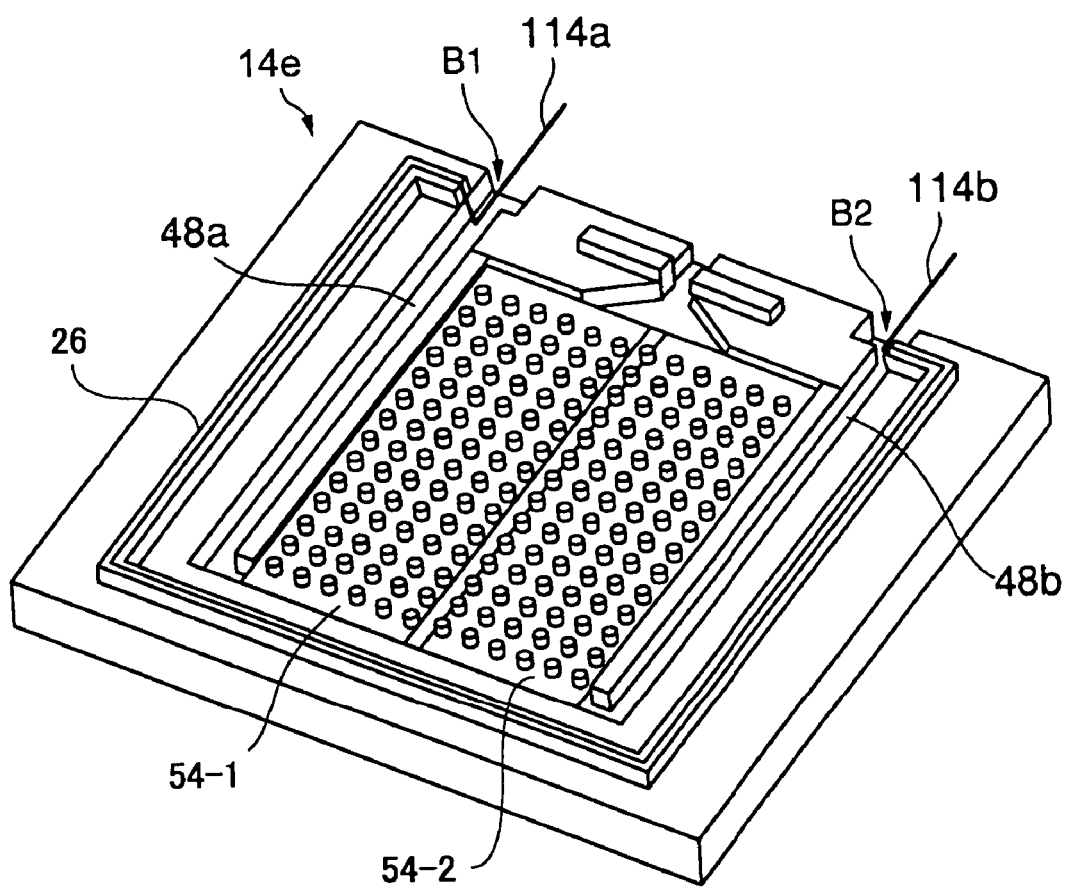
FIG. 16 is a perspective view of a fuel electrode housing of the fuel cell for illustrating an assembly and sealing structure of the fuel cell according to the first embodiment of the present invention.

Next, a description is given, with reference to FIG. 16, of a variation of the structure where the fuel electrode housing and the air electrode housing are superimposed to be sealed.

A fuel electrode housing 14e is equal to the fuel electrode housing 14 of this embodiment. An air electrode housing (not shown in the drawing) to be superimposed on the fuel electrode housing 14e is equal to the air electrode housing 16 of this embodiment.

In the fuel electrode housing 14e, metal wires 114a and 114b formed of a nickel-chromium alloy, for instance, are provided on the frame body part 26. The metal wires 114a and 114b are extended outward from the exit parts indicated by arrows B1 and B2, respectively, of the fuel supply channels 48a and 48b plated with metal electrode layers $54_{-1}$ and $54_{-2}$. At this point, the metal wires 114a and 114b are bonded to the frame body part 26 with a conductive adhesive agent.

In assembling the fuel electrode 10 by superimposing the air electrode housing on the fuel electrode housing 14e, such a high current as to melt a mold is caused to flow through each of the metal wires 114a and 114b so that the housing material around each of the metal wires 114a and 114b is melted. As a result, the fuel electrode housing 14e and the air electrode housing are welded together to be sealed.

In the assembled fuel cell 10, the metal wires 114a and 114b can be used as extension electrodes.

Figure 17:
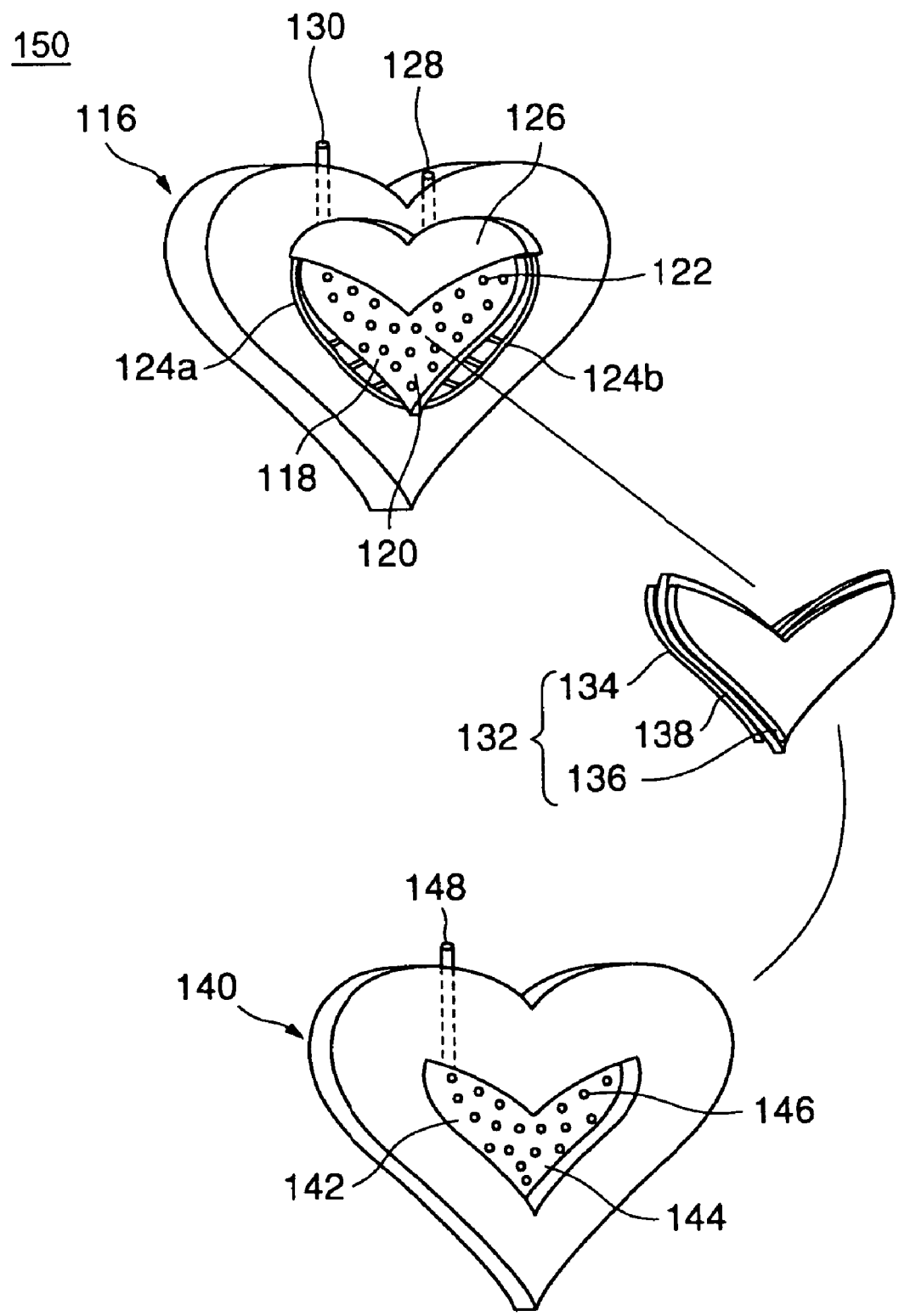
FIG. 17 is an exploded perspective view of an eighth variation of the fuel cell according to the first embodiment of the present invention.
Figure 18:
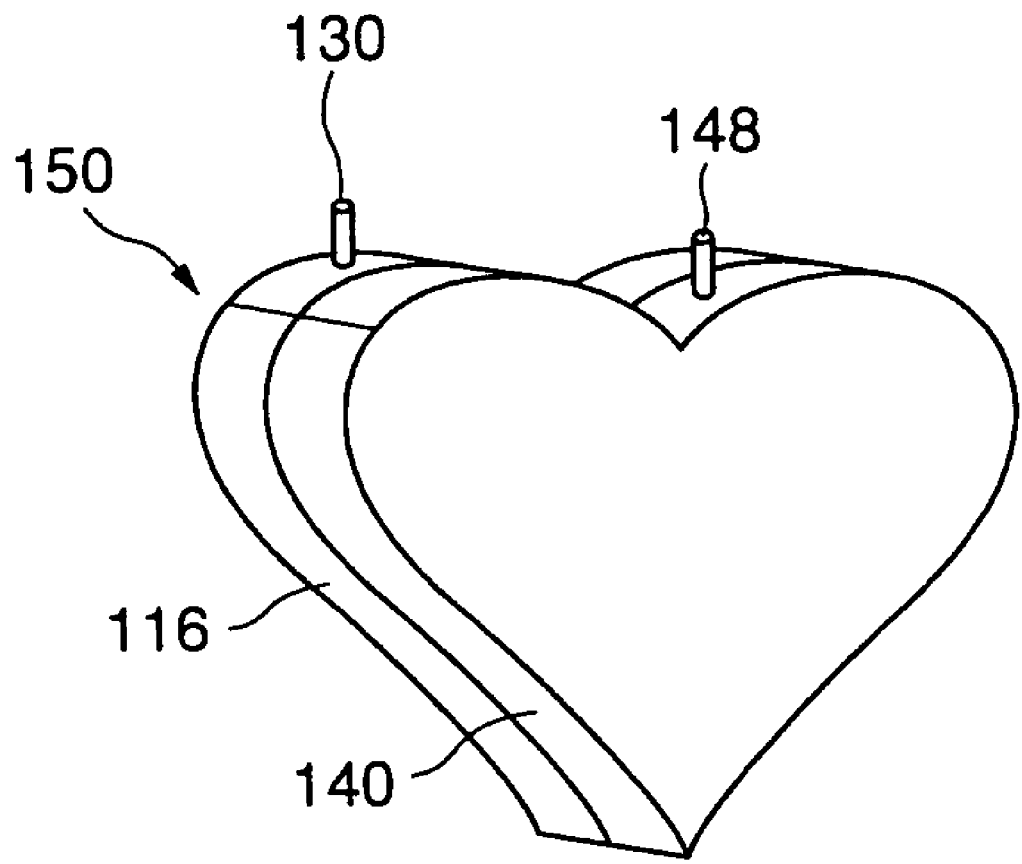
FIG. 18 is a perspective view of the eighth variation of the fuel cell in an assembled state according to the first embodiment of the present invention.

Next, a description is given, with reference to FIGS. 17 and 18, of a fuel cell 150, which is an eighth variation of the fuel cell 10.

Unlike the above-described variations, the fuel cell 150 has a shape defined by two main flat faces and a side face connecting the flat faces which side face is freely shaped to include a curved part, such as a heart-like shape, for instance. In respects other than shape, for instance, in the structure of each member, the eighth variation is basically equal to the other variations.

A fuel electrode housing 116 of the eighth variation is formed to have a heart-like shape. Referring to FIG. 17, the fuel electrode housing 116 includes a fuel reaction chamber 118, a metal electrode layer 120, projections 122 (a metal member) formed on the metal electrode layer 120, fuel supply channels 124a and 124b, a fuel reservoir 126, a fuel inlet 128, and an extension electrode 130.

Referring to FIG. 17, an MEA 132 of the eighth variation having a heart-like shape includes a fuel electrode 134 sized to be containable in the fuel reaction chamber 118, an air electrode 136 sized to be containable in a below-described air reaction chamber 142, and a polyelectrolyte membrane 138 sized to be larger than the fuel reaction chamber 118 and the air reaction chamber 142. The fuel electrode 134 and the air electrode 136 are joined to the respective sides of the polyelectrolyte membrane 138.

An air electrode housing 140 of the eighth embodiment is formed to have a heart-like shape having the same outside dimensions as the fuel electrode housing 116. Referring to FIG. 17, the air electrode housing 140 includes the air reaction chamber 142, a metal electrode layer 144 formed in the air reaction chamber 142, projections 146 (a metal member) formed on the metal electrode layer 144, and an extension electrode 148. As is not graphically represented in FIGS. 17 and 18, an air inlet is provided on the rear side (opposite to the side facing the MEA 132) of the air electrode housing 140.

The fuel electrode housing 116, the MEA 132, and the air electrode housing 140 are superimposed, sealed, and fixed with the fuel electrode 134 of the MEA 132 facing the metal electrode layer 120 of the fuel electrode housing and the air electrode 136 of the MEA facing the metal electrode layer 144 of the air electrode housing 140. Thus, the fuel cell 150 is assembled as shown in FIG. 18.

Thus, according to the present invention, the shape of an electric apparatus using a fuel cell may be designed freely without being limited by the conventional characteristic shape of the fuel cell.

Figure 19:
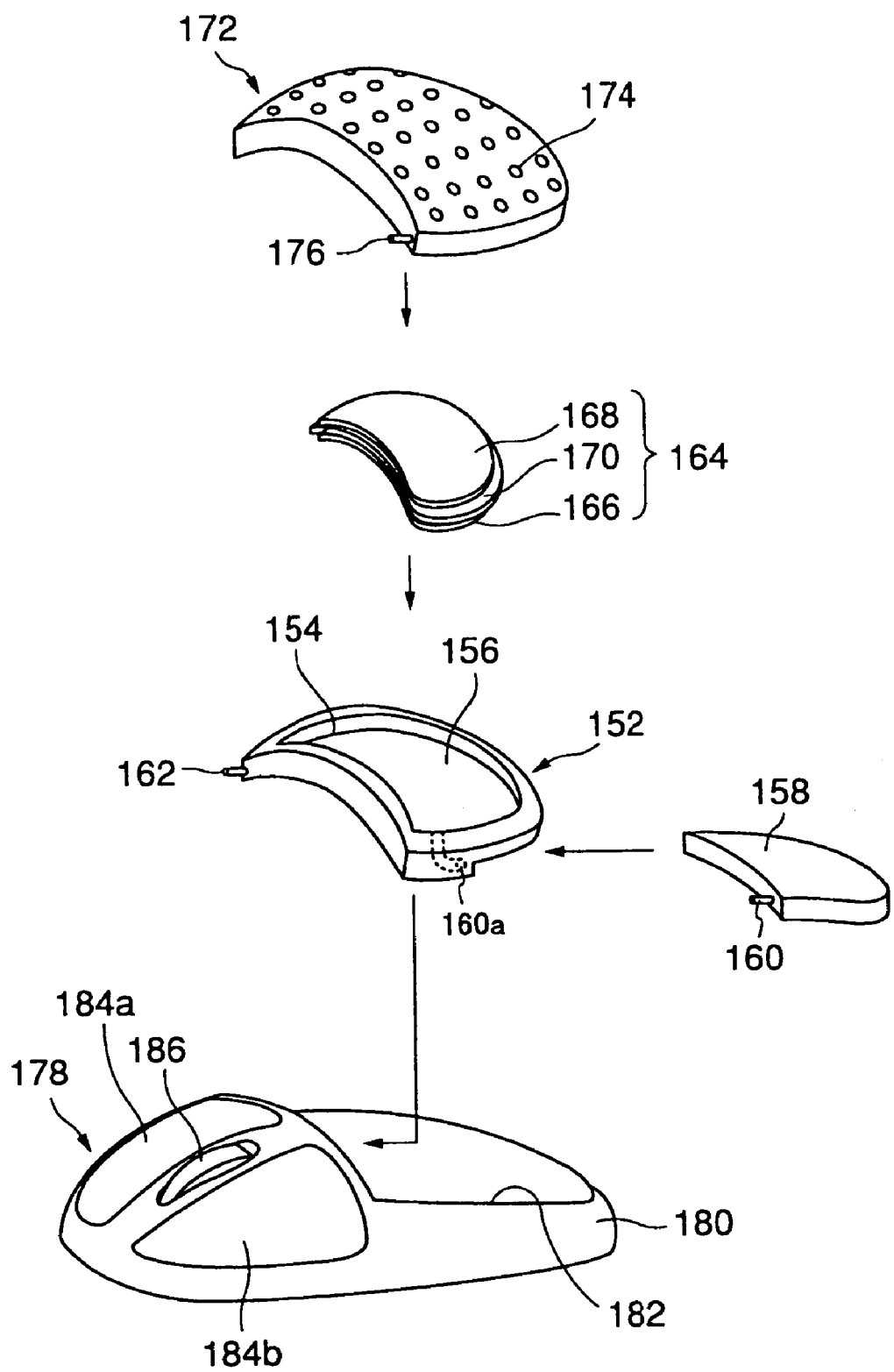
FIG. 19 is an exploded perspective view of a mouse and a ninth variation of the fuel cell mounted therein according to the first embodiment of the present invention.

Next, a description is given, with reference to FIG. 19, of a ninth variation of the fuel cell 10.

The ninth variation has a three-dimensionally curved shape and is employed, for instance, in a mouse for a personal computer.

A fuel electrode housing 152 of the ninth variation has a three-dimensionally curved shape, and is sized according to the shape of a recess 182 of a mouse 178 in which recess 182 the fuel cell (ninth variation) is mounted. The same applies to the other members described below. Referring to FIG. 19, the fuel electrode housing 152 includes a fuel reaction chamber 154., a metal electrode layer 156 having a curved shape, a fuel reservoir 158 formed as a detachable cartridge, a fuel inlet 160, and an extension electrode 162. The fuel inlet 160 attached to the fuel reservoir 158 is inserted into and coupled to a fuel receiving hole 160a formed in the fuel electrode housing 152 so that fuel is supplied to the fuel reaction chamber 154. The fuel inlet 160 also serves as a refill hole through which the fuel reservoir 158 is refilled with fuel when the fuel reservoir 158 is detached from the fuel electrode housing 152.

Referring to FIG. 19, an MEA 164 of the ninth variation having a three-dimensionally curved shape includes a fuel electrode 166 sized to be containable in the fuel reaction chamber 154, an air electrode 168 sized to be containable in an air reaction chamber (not shown in the drawing) of a later-described air electrode housing 172, and a polyelectrolyte membrane 170 sized to be larger than the fuel reaction chamber 154 and the air reaction chamber. The fuel electrode 166 and the air electrode 168 are joined to the respective sides of the polyelectrolyte membrane 170.

The air electrode housing 172 of the ninth variation is formed to have a complementary shape having the same outside dimensions as the fuel electrode housing 152. Referring to FIG. 19, the air electrode housing 172 includes vent holes 174 and an extension electrode 176. As is not graphically represented in FIG. 19, the air reaction chamber is formed on the lower side of the air electrode housing 172, and a metal electrode layer is formed in the air reaction chamber.

The fuel electrode housing 152, the MEA 164, and the air electrode housing 172 are contained in the recess 182 of a housing 180 of the mouse 178 having a three-dimensionally curved shape. As long as the entire fuel cell (ninth variation) is formed to have a shape complementary to the shape of the housing 180, there is no need for all the members of the fuel cell, such as the air electrode housing 172, the fuel electrode housing 152, and the metal electrode layer 156, to be formed to include a curved surface. The mouse 178 includes mouse switches 184a and 184b and a wheel switch 186.

The ninth variation of the fuel cell 10 is shaped in accordance with the shape of a mouse, which is a palm-held device and inevitably has a three-dimensionally curved shape for ergonomic reasons. Thus, the mouse can be shaped freely without being limited by the shape of the fuel cell. Therefore, the latitude in designing the mouse can be ensured. As a result, when the fuel cell is mounted in the mouse, there is no unused space left in the mouse. That is, the fuel cell is mounted in a vacant space in the mouse. Further, it is not necessary to connect the ninth variation of the fuel cell 10 to a fuel source all the time. This ensures the excellent operability of the mouse.

Figure 20:
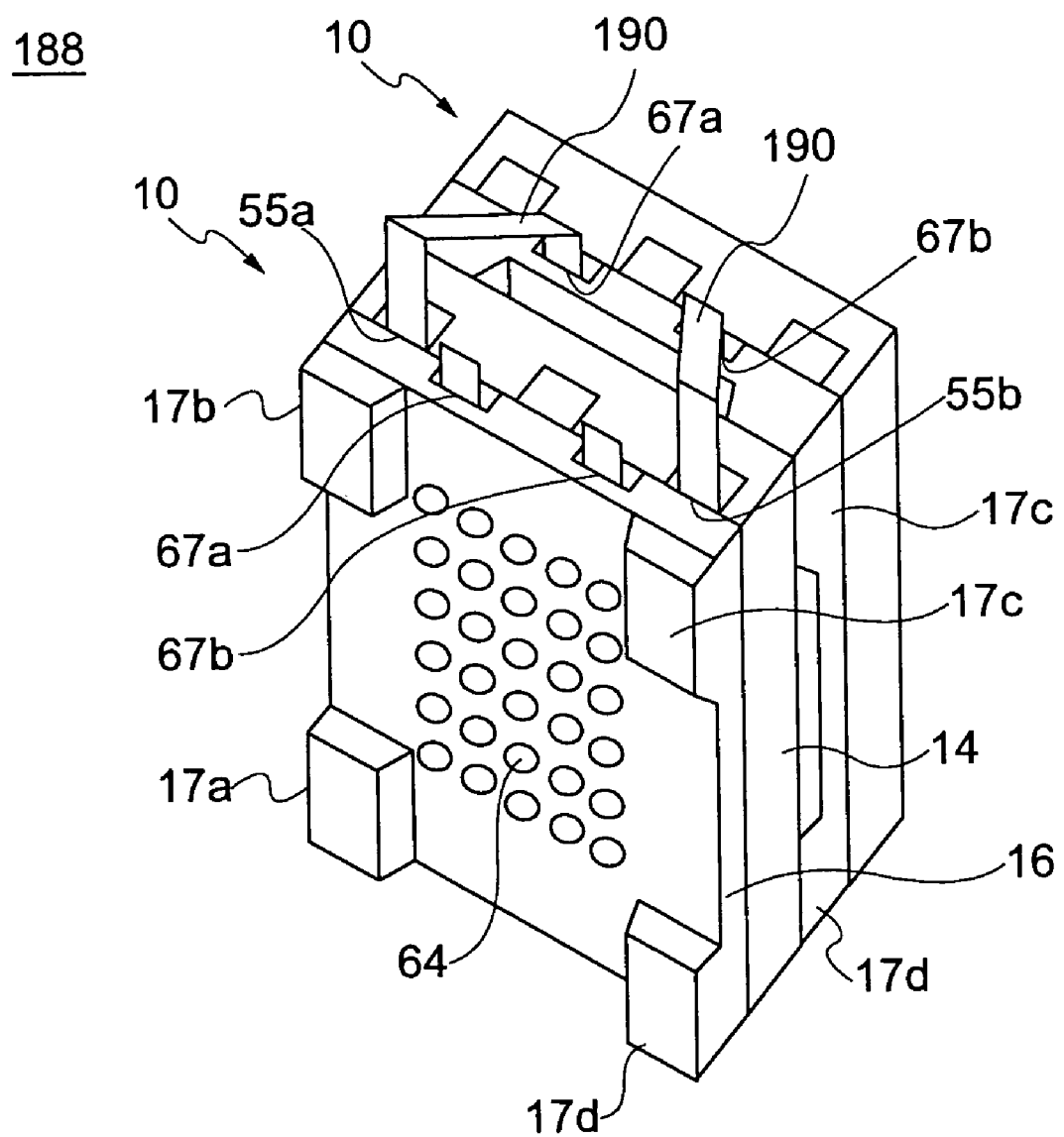
FIG. 20 is a perspective view of a fuel cell stack according to the first embodiment of the present invention.

Next, a description is given, with reference to FIG. 20, of a fuel cell stack 188 including the fuel cells 10 according to the first embodiment of the present invention.

Referring to FIG. 20, the fuel cell stack 188 is formed by stacking and fixing the fuel cells 10 arranged with the same orientation. The number of fuel cells 10 employed in the fuel cell stack 188 is two in the case of FIG. 20. Practically, however, the number of fuel cells 10 to be employed is determined according to the voltage required by the electric apparatus to be used.

The extension electrodes 55a and 55b of one of the adjacent fuel cells 10 and the extension electrodes 67a and 67b of the other one of the fuel cells 10 are connected by engaging substantially C-shaped short bars (engagement members) 190 formed of conductive material with the openings where the extension electrodes 55a and 55b and the extension electrodes 67a and 67a are exposed. Thereby, the adjacent fuel cells 10 are electrically connected and fixed as well. As a result, there is no need of special fixing members for fixing the adjacent fuel cells 10. If special fixing members are provided, the adjacent fuel cells 10 can be fixed with more reliability by the short bars 190 and the special fixing members.

In the fuel cell stack 188, a space is formed between the adjacent fuel cells 10 by the interposition of the projections 17a through 17d of the air electrode housing 16 of one of the fuel cells 10. This space prevents the vent holes 64 formed in the air electrode housing 16 from being blocked, thus allowing air to flow through the vent holes 64 into the air reaction chamber 62 (not visible in FIG. 20).

In the fuel cell 10 of this embodiment, a heater may be provided in the fuel electrode housing 14 and/or the air electrode housing 16 so that convection circulation may occur in the fuel in the fuel reaction chamber 50 and/or the air in the air reaction chamber 62.

Further, fuel may be pumped into the fuel electrode housing 14.

Furthermore, an elastic material layer may be provided to the inside and/or the outside of the fuel electrode housing 14 and/or the air electrode housing 16 so as to absorb impact.

[Second Embodiment]

Next, a description is given below of a second embodiment according to the present invention.

First, a description is given, with reference to FIGS. 21 through 24, of a fuel cell 210 according to the second embodiment, following its assembling procedure.

Figure 21:
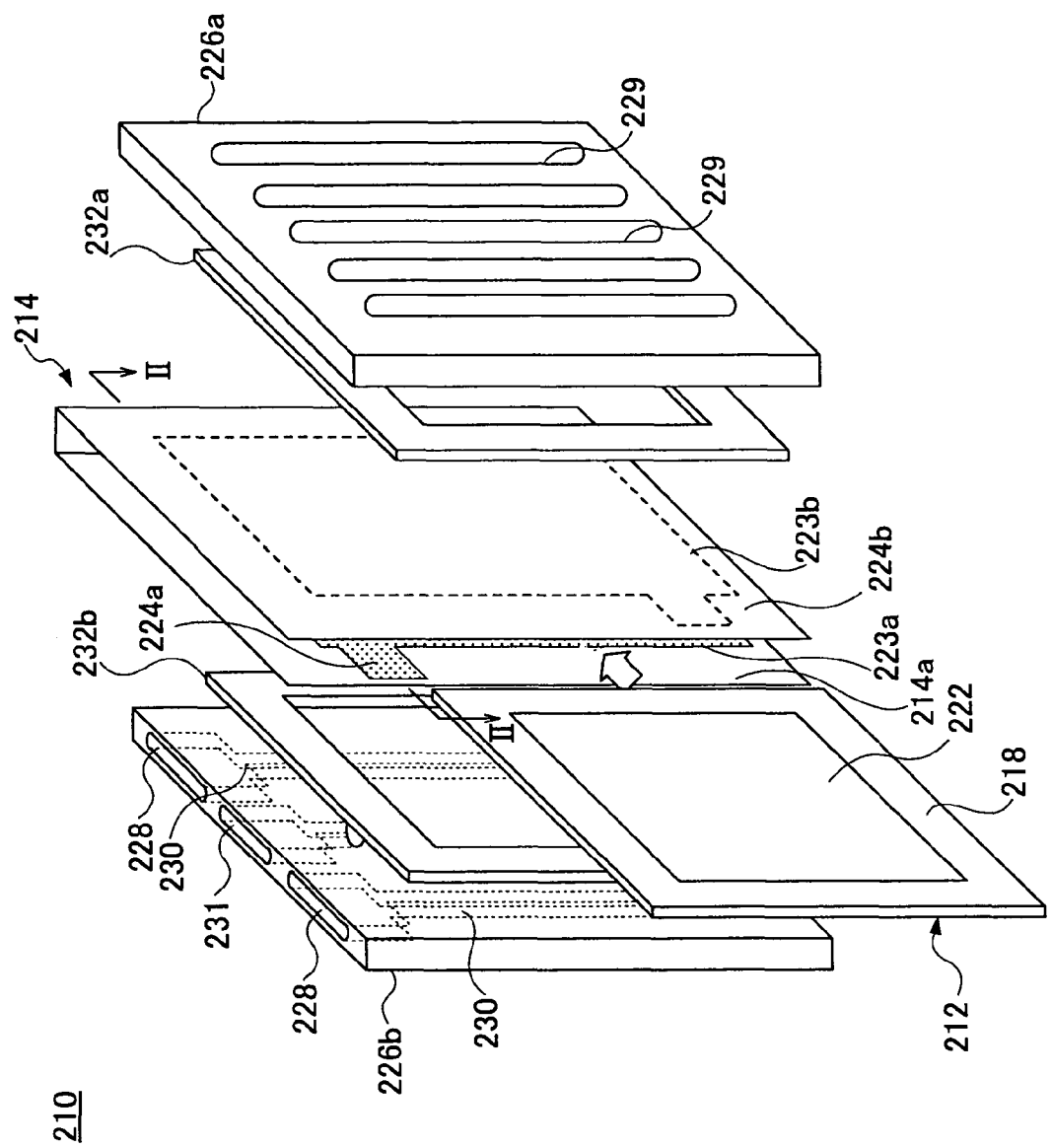
FIG. 21 is an exploded perspective view of a fuel cell according to a second embodiment of the present invention.
Figure 22:
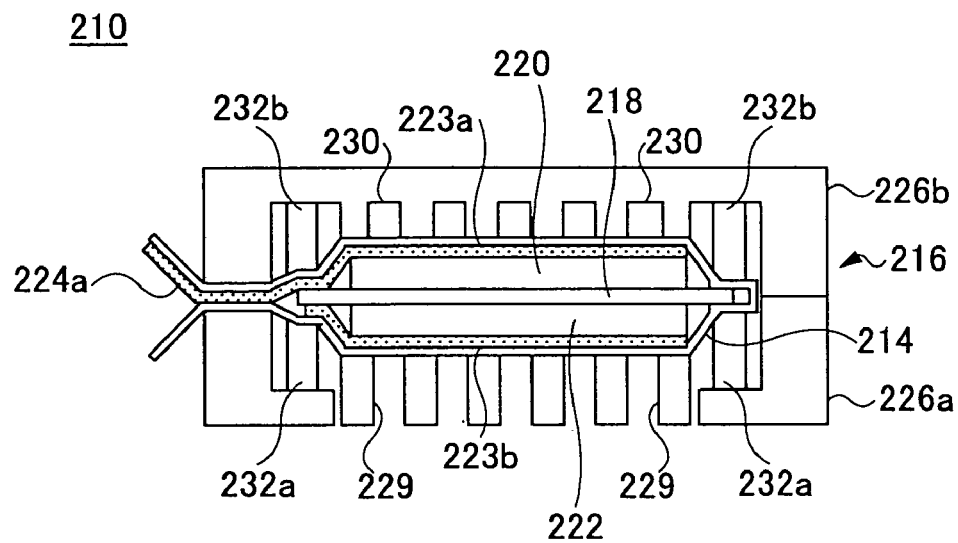
FIG. 22 is a sectional view of the fuel cell of FIG. 21 taken along the line II—II according to the second embodiment of the present invention.

FIG. 21 is an exploded perspective view of the fuel cell 210, and FIG. 22 is a sectional view of the fuel cell 210 in an assembled state taken along the line II—II. In FIG. 22, hatching for indicating sectional portions of the fuel cell 210 is omitted for reason of convenience.

Referring to FIGS. 21 and 22, the fuel cell 210 of the second embodiment includes an MEA 212, a substrate 214 for holding the MEA 212, and a housing 216.

Figure 23:
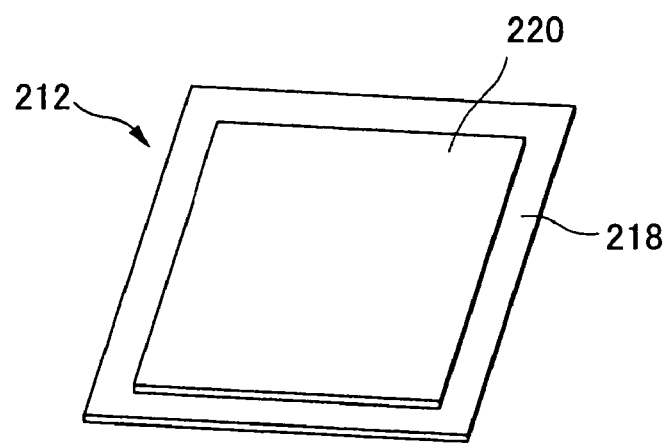
FIG. 23 is a perspective view of an MEA of the fuel cell according to the second embodiment of the present invention.

FIG. 23 is a perspective view of the MEA 212. Referring to FIGS. 21 through 23, the MEA 212 includes a fluorine-based polyelectrolyte membrane 218, and a fuel electrode 220 and an air electrode 222 formed of carbon paper, the fuel electrode 220 and the air electrode 222 being joined to the respective sides of the polyelectrolyte membrane 218. Each of the fuel electrode 220 and the air electrode 222 has a rectangular shape and sized to be smaller than the MEA 218.

The side of the fuel electrode 220 which side is joined to the polyelectrolyte membrane 218 is coated with carbon holding a Pt/Ru catalyst. On the other hand, the side of the air electrode 222 which side is joined to the polyelectrolyte membrane 218 is coated with carbon holding a Pt catalyst. The fuel electrode 220 and the air electrode 222 are bonded to the polyelectrolyte membrane 218 by hot pressing, for instance, thereby ensuring that the catalyst layers of the fuel electrode 220 and the air electrode 222 come into contact with the polyelectrolyte membrane 218.

Figure 24:
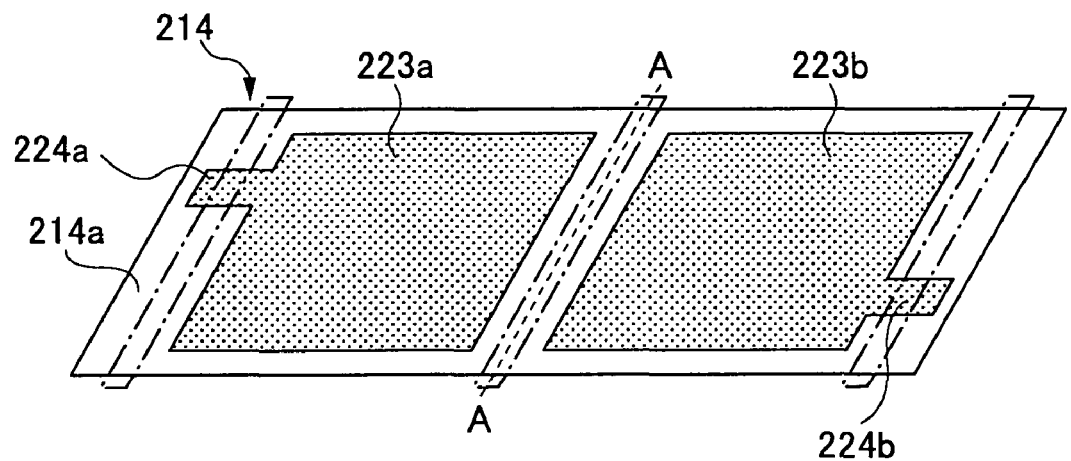
FIG. 24 is a perspective view of a substrate of the fuel cell in an unfolded state according to the second embodiment of the present invention.

FIG. 24 is a perspective view of the substrate 214 in an unfolded state.

The substrate 214 employs a flexible thin material on which a conductor is patternable. The substrate 214 is formed to have an area larger than the combined area of both sides of the MEA 212. A general-purpose flexible printed board formed by bonding a copper layer to flexible, bendable resin material such as polyester or polyimide is suitably employable as a material for the substrate 214. In the case of employing a flexible printed board, its thickness is not limited to particular values. However, the flexible printed board preferably has a thickness greater than or equal to approximately 15 μm for ensuring its strength and less than or equal to approximately 300 μm for ensuring the sealing and reducing the thickness of the fuel cell 210. Alternatively, a substrate formed by bonding a copper layer to a multilayer material of a metal thin film and the above-described resin material, for instance, may be used as a material for the substrate 214.

A pair of conductor layers 223a and 223b corresponding to the respective sides of the MEA 212 are formed by patterning on a side 214a of the substrate 214. The conductor layers 223a and 223b are formed to have rectangular shapes substantially as large in size as the fuel electrode 220 and the air electrode 222, respectively. Further, extension electrodes 224a and 224b are patterned so as to extend from the conductor layers 223a and 223b, respectively. Instead of forming the extension electrodes 224a and 224b by patterning, the conventional structure where extension electrodes are attached as separate members may be employed. Material having excellent conductivity, such as copper, gold, or platinum, is employed as material for the conductor layers 223a and 223b and the extension electrodes 224a and 224b. The conductor layers 223a and 223b and the extension electrodes 224a and 224b are formed to have a thickness of 10 to 105 nm, for instance.

Referring to FIGS. 21 and 22, the housing 216 is composed of two half bodies 226a and 226b. Each of the half bodies 226a and 226b is formed by molding of, for instance, an insulating resin material. A plurality of slits 229 for introducing air to the air electrode 222 are formed in the half body 226a provided on the air electrode 222 side. A plurality of fuel inlets 228 for introducing fuel to the fuel electrode 220 are formed in the half body 226b provided on the fuel electrode 220 side. Further, a plurality of fuel channels 230 are formed on the face of the half body 226b on its fuel electrode 220 side so as to communicate with the fuel inlets 228. Outlets 231 for discharging generated $CO_2$ are also formed in the half body 226b.

A description is given, with reference to FIGS. 21 and 22, of the structural assembly of the fuel cell 210 employing the MEA 212, the substrate 214, and the housing 216.

The MEA 212 is disposed on the face 214a of the substrate 214, and the substrate 214 is folded into two along the line A—A of FIG. 24 so as to hold the MEA 212 between the two portions of the face 214a separated by the line A—A. As a result, the MEA 212 is held between the paired conductor layers 223a and 223b.

Frame-like packings 232a and 232b are provided on the edge parts of both outside faces of the folded substrate 214 with the MEA 212 being held inside the folded substrate 214. At this point, referring to FIG. 22, the packings 232a and 232b are vertically positioned so as to hold only the edge part of the polyelectrolyte membrane 218, which edge part protrudes from between the fuel and air electrodes 220 and 222, and a predetermined part of the substrate 214, on which the paired conductor layers 232a and 232b are formed. The predetermined part of the substrate 214 held by the packings 232a and 232b is indicated by dot-dash rectangles in FIG. 24.

The two half bodies 226a and 226b are provided so as to cover the substrate 214 and the packings 232a and 232b with the part of the substrate 214 on which part the extension electrodes 224a and 224b are formed being exposed. Then, the two half bodies 226a and 226b are fastened by a fastening member (not shown in the drawings). As a result, the fuel cell 210, whose members are fixed as a unit, is obtained. Although not graphically represented, a distribution structure for distributing the air flowing through the slits 229 to the air electrode 222 and a distribution structure for distributing the fuel flowing into the fuel channels 230a through 230c to the fuel electrode 220 are provided in the fuel cell 210. FIG. 22 is a diagram showing a section of the fuel cell 210 including the extension electrode 224a. Therefore, the extension electrode 224b is not shown in FIG. 22.

For instance, when a load is connected between the paired extension electrodes 224a and 224b via electric wires by appropriate means, power is supplied to the load from the fuel cell 210 serving as a power source.

The fuel cell 210 according to the second embodiment employs, as a collector, a thin substrate 214 on which the conductor layers 223a and 223b are formed. Therefore, the inside of the fuel cell 210 can be sealed with certainty even if the substrate 214 is sandwiched between the packings 232a and 232b. Accordingly, fuel leakage from inside the fuel cell 210 can be prevented. Further, the fuel cell 210 can be reduced in thickness and size. If a flexible printed board is employed for the substrate 214, the above-described effects can be suitably obtained, and good operability can be ensured at the time of assembling the fuel cell 210. On the other hand, if a multi-layer substrate including a thin metal film, which has excellent strength, is employed for the substrate 214, no breakage of the substrate 214 will be caused even if a force is exerted thereon at the time of assembling or using the fuel cell 210.

According to the fuel cell 210 of this embodiment, the extension electrodes 224a and 224b patterned on the substrate 214 are directly extended outward from the seal part (the part held by the packings 232a and 232b) that seals the main body of the fuel cell 210. Thus, the fuel cell 210 achieves a simple electrode extension structure without fuel leakage.

Figure 25:
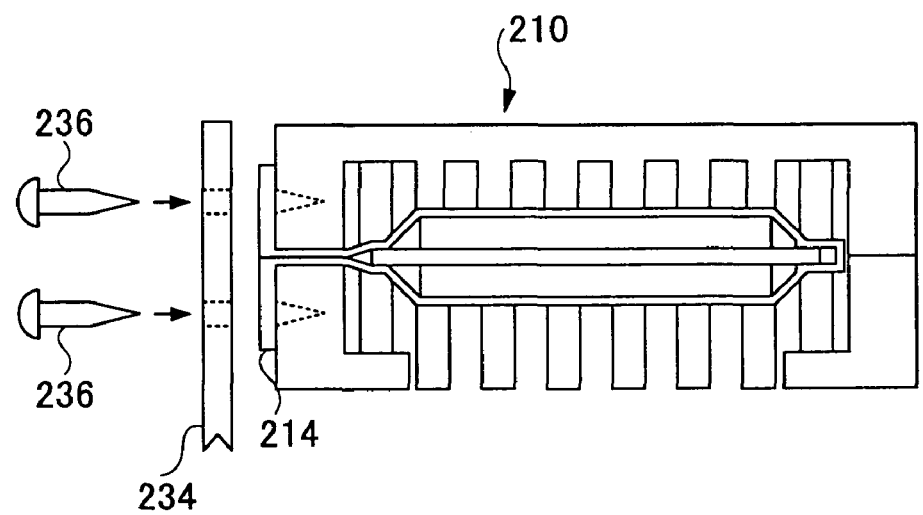
FIG. 25 is a sectional view of the fuel cell for illustrating another configuration thereof according to the second embodiment of the present invention.

The fuel cell 210 of this embodiment may have a configuration as shown in FIG. 25 instead of the configuration of FIG. 22. That is, in the fuel cell 210, the parts of the substrate 214 on which parts the extension electrodes 224a and 224b are formed may be folded back toward the half bodies 226b and 226a, respectively. Then, a substrate 234, which is a separate member, may be placed in contact with the half bodies 226a and 226b through the folded parts of the substrate 214, and fixed to the half bodies 226a and 226b using a pair of or more metal screws 236 as conductive fastening members. In FIG. 25, the conductor layers 223a and 223b and the extension electrodes 224a and 224b are omitted. A circuit or circuit pattern (not shown in the drawing) formed on the substrate 234 is electrically connected to the extension electrodes 224a and 224b through the screws 236.

As a result, the substrate 234 on which an electronic or electric component using the fuel cell 210 as a power supply is mounted can be suitably attached to the fuel cell 210 by the screws 236 with ease. In this case, the electronic or electric component may be attached directly to the parts of the substrate 214 on which parts the extension electrodes 224a and 224b are formed.

In this case, instead of being fastened to the extension electrodes 224a and 224b by the fastening members 236, the substrate 234 may be soldered to the extension electrodes 224a and 224b so that the circuit of the substrate 234 may be electrically connected thereto.

Figure 26:
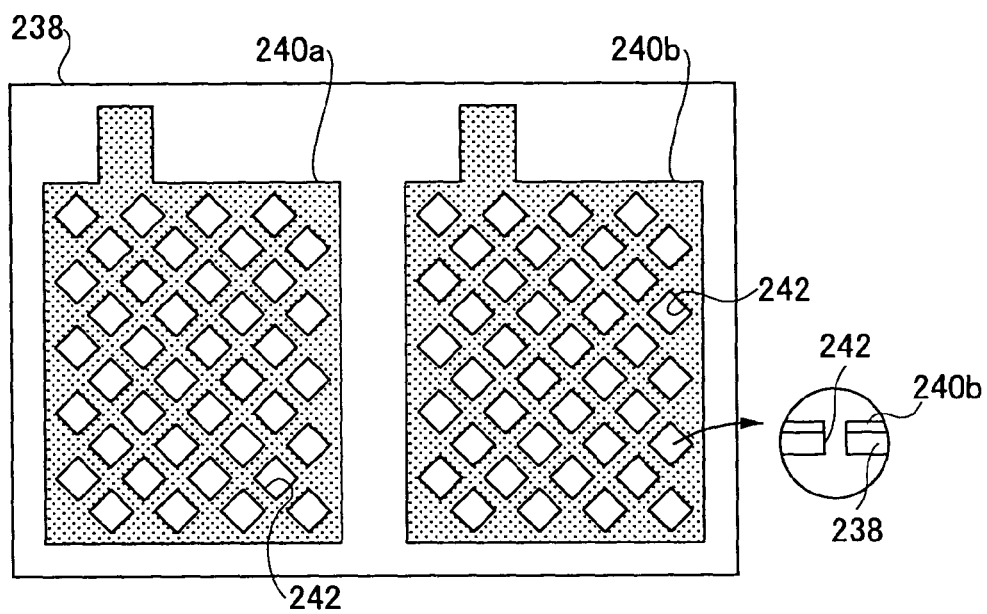
FIG. 26 is a diagram showing a substrate employed in a variation of the fuel cell in an unfolded state according to the second embodiment of the present invention.

Next, a description is given, with reference to FIG. 26, of a variation of the fuel cell 210 according to the second embodiment.

The variation differs from the fuel cell 210 only in the substrate structure.

That is, a substrate 238 of the variation includes a pair of conductor layers 240a and 240b formed thereon. The conductor layers 240a and 240b and the corresponding parts of the substrate 238 are formed like meshes by mechanical blanking performed thereon.

In the variation of the fuel cell 210, hole parts 242 of the meshes of the substrate 238 can be used as channels to cause the fuel and the air introduced into the half bodies 226b and 226a to evenly flow into the fuel and air electrodes 220 and 222, respectively. Further, the conductor layers 240a and 240b are formed like meshes. That is, the conductor layers 240a and 240b are formed to have convex and concave parts. Therefore, by pressing the conductor layers 240a and 240b against the MEA 212, it is ensured that the conductor layers 240a and 240b come into contact with the MEA 212 at the convex parts of the conductor layers 240a and 240b. As a result, the electric connection between the conductor layers 240a and 240b and the MEA 212 can be ensured. Accordingly, good power generation efficiency can be obtained. In this case, the same effects as described above can be produced by forming uneven conductor layers instead of the conductor layers 240a and 240b.

Figure 27:
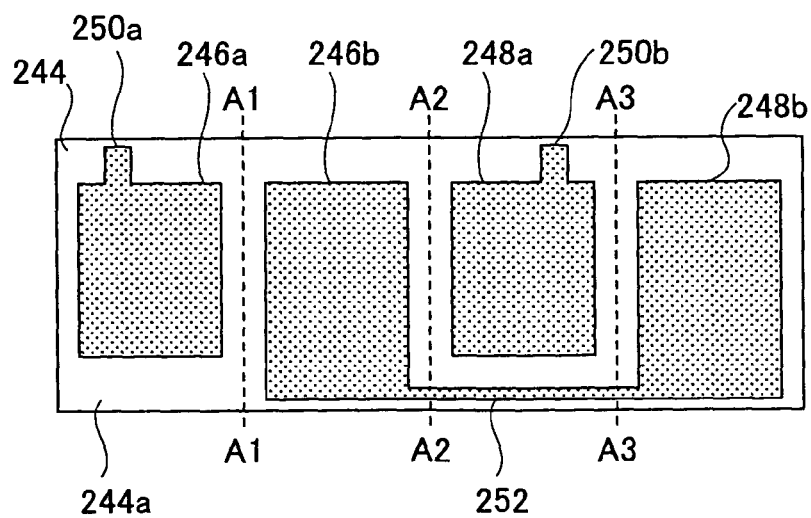
FIG. 27 is a diagram showing a substrate employed in a fuel cell stack in an unfolded state according to the second embodiment of the present invention.
Figure 28:
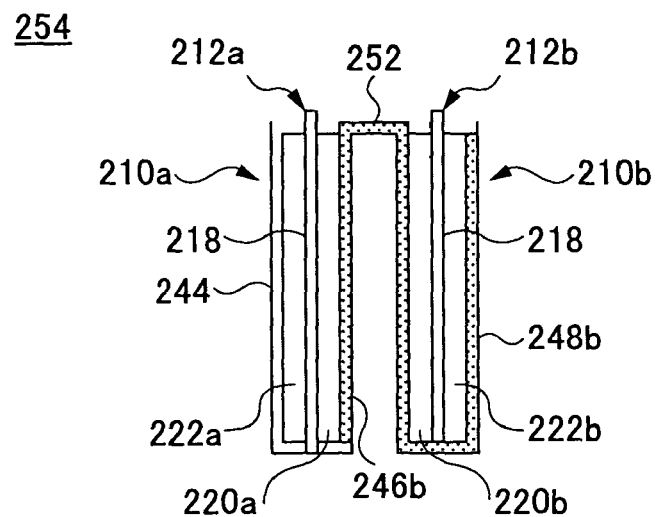
FIG. 28 is a schematic sectional view of the fuel cell stack in an assembled state according to the second embodiment of the present invention.

Next, a description is given, with reference to FIGS. 27 and 28, of a fuel cell stack 254 according to the second embodiment of the present invention. FIG. 27 is a plan view of a substrate 244 employed in the fuel cell stack 254 in an unfolded state. FIG. 28 is a schematic sectional elevation of the fuel cell stack 254.

In this embodiment, the fuel cell stack 254 includes two fuel cells 210a and 210b connected in series. However, the fuel cell stack may include more than two fuel cells. Each of the fuel cells 210a and 210b of the fuel cell stack 254 has the same basic configuration as the above-described fuel cell 210 according to the second embodiment, and a description thereof is omitted.

The substrate 244 is sized to correspond to the combined area of both faces of an MEA 212a and both faces of an MEA 212b. Conductor layers 246a, 246b, 248a, and 248b are patterned on four respective divided parts of a side 244a of the substrate 244. The conductor layers 246a and 246b are paired, and the conductor layers 248a and 248b are paired. In the former pair, the conductor layers 246a and 246b come into contact with an air electrode 222a and a fuel electrode 220a, respectively, of the MEA 212a. In the latter pair, the conductor layers 248a and 248b come into contact with a fuel electrode 220b and an air electrode 222b, respectively, of the MEA 212b. Extension electrodes 250a and 250b are patterned on the face 244a of the substrate 244 so as to extend from the conductor layers 246a and 248a, respectively. Further, a connection electrode 252 electrically connecting the conductor layers 246b and 248b is patterned on the face 244a of the substrate 244.

The substrate 244 is folded so that the paired conductor layers 246a and 246b are positioned opposite each other to hold the MEA 212a therebetween and the paired conductor layers 248a and 248b are positioned opposite each other so as to hold the MEA 212b therebetween. That is, referring to FIG. 27, the substrate 244 is folded along the line A1—A1 so that the parts of the face 244a corresponding to the conductor layers 246a and 246b oppose each other with the MEA 212a being held therebetween, folded along the line A3—A3 so that the parts of the face 244a corresponding to the conductor layers 248a and 248b oppose each other with the MEA 212b being held therebetween, and then folded along the line A2—A2 so that the parts of the face 244a corresponding to the conductor layers 246b and 248a face in the directions away from each other. In other words, referring to FIG. 28, the substrate 244 is valley-folded along the lines A1—A1 and A3—A3 and mountain-folded along the line A2—A2. As a result, the fuel cell stack 254 shown in FIG. 28, which has the two fuel cells 210a and 210b arranged side by side, or stacked, and connected in series, is fabricated.

The fuel cell stack 254 of this embodiment can be reduced in thickness and size, compared with the conventional fuel cell stack, with the sealing of the inside of each of the fuel cells 210a and 210b being ensured. Further, since the connection electrode 252 connecting the fuel cells 210a and 210b is a conductive pattern formed on the substrate 244, the fuel cells 210a and 210b can be connected by a simple connection structure. Further, the air electrodes 222a and 222b face the outside of the fuel cell stack 254 (in the directions away from each other) in the stacked state of the fuel cells 210a and 210b. This configuration enables the fuel cell stack 254 to easily have a structure for evenly distributing air over the entire surface of each of the air electrodes 222a and 222b.

In the fuel cell stack 254 of this embodiment, a plurality of pairs of conductor layers, that is, the paired conductor layers 246a and 246b and the paired conductor layers 248a and 248b are formed simultaneously on the single substrate 244. Alternatively, however, the substrate 244 may be formed by joining a plurality of substrates on each of which only a pair of conductor layers are formed. That is, the fuel cell stack 254 may be formed by joining the individually fabricated fuel cells 210 of this embodiment.

Figure 29:
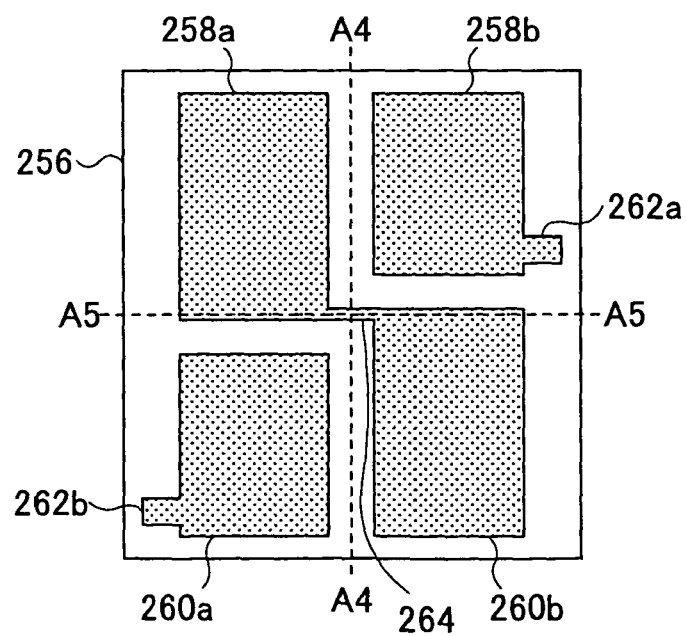
FIG. 29 is a diagram showing a substrate employed in a first variation of the fuel cell stack in an unfolded state according to the second embodiment of the present invention.

Next, a description is given, with reference to FIG. 29, of a first variation of the fuel cell stack 254 according to the second embodiment of the present invention.

The first variation differs from the fuel cell stack 254 only in the substrate configuration.

That is, referring to FIG. 29, a pair of conductor layers 258a and 258b that come into contact with the fuel and air electrodes 220a and 222a are patterned on the upper left and right sides, respectively, of a substrate 256 of the first variation, and a pair of conductor layers 260a and 260b that come into contact with the fuel and air electrodes 220b and 222b are patterned on the lower left and right sides, respectively, of the substrate 256. Extension electrodes 262a and 262b are patterned on the substrate 256 so as to extend from the conductor layers 258b and 260a, respectively. Further, a connection electrode 264 electrically connecting the conductor layers 258a and 260b is patterned on the substrate 256.

The substrate 256 is folded so that the paired conductor layers 258a and 258b are positioned opposite each other so as to hold the MEA 212a therebetween and the paired conductor layers 260a and 260b are positioned opposite each other so as to hold the MEA 212b therebetween. That is, referring to FIG. 29, the substrate 256 is valley-folded in two along the line A4—A4. Then, the folded substrate 256, which is now reduced to half of its size in the unfolded state, is further folded along the line A5—A5 in an appropriate direction. As a result, the first variation of the fuel cell stack 254, where the two fuel cells 210a and 210b are stacked and connected in series, is fabricated.

The conductive pattern serving as the connection electrode (252 or 264) connecting the fuel cells 210a and 210b can be shorter in the first variation than in the fuel cell stack 254.

Figure 30:
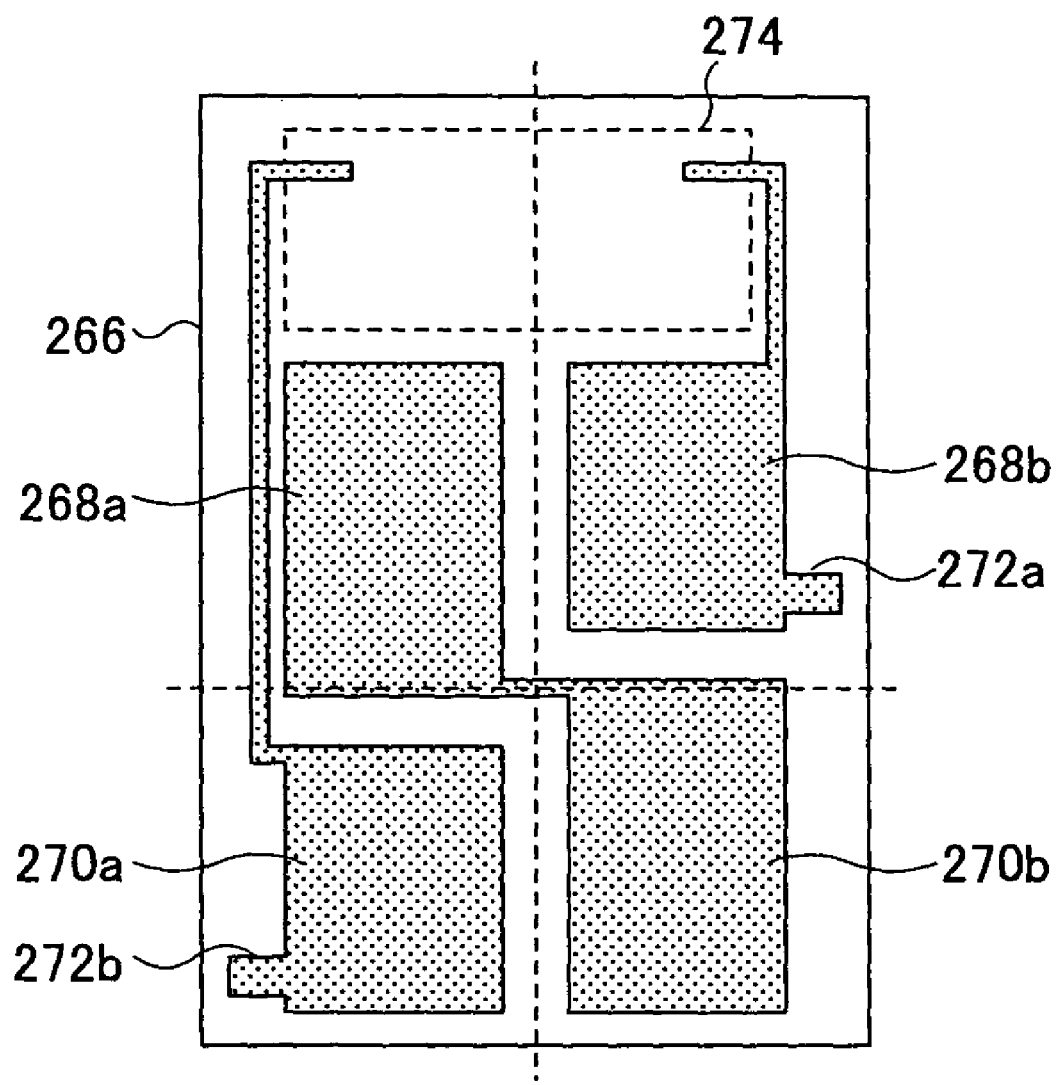
FIG. 30 is a diagram showing a substrate employed in a second variation of the fuel cell stack in an unfolded state according to the second embodiment of the present invention.

Next, a description is given, with reference to FIG. 30, of a second variation of the fuel cell stack 254 according to the second embodiment.

The second variation includes a substrate 266 which is different in configuration from the substrate 256 of the first variation.

That is, in addition to conductor layers 268a, 268b, 270a, and 270b and extension electrodes 272a and 272b that are equal to the conductor layers 258a, 258b, 260a, and 260b and the extension electrodes 262a and 262b, respectively, of the substrate 256 of the first variation, the substrate 266 further includes a circuit pattern 274 on which a device is mountable, the circuit pattern 274 being formed so as to be connected to the conductor layers 268b and 270a.

At the time of assembling the second variation of the fuel cell stack 254, the circuit pattern 274 may be placed outside the fuel cells 210a and 210b if a packing is provided inside the position of the circuit pattern 274, that is, if the housing of the second variation of the fuel cell stack 254 is provided inside the position of the circuit pattern 274 so as to exclude the circuit pattern 274. On the other hand, the circuit pattern 274 may be placed inside the second variation of the fuel cell stack 254 if a packing is placed outside the position of the circuit pattern 274, that is, if the housing is placed outside the position of the circuit pattern 274 so as to include the circuit pattern 274.

Accordingly, at the time of constructing a system that integrates the fuel cell stack (second variation) with an electric device (electric circuit) such as an LED using the fuel cell stack as a power supply, or at the time of constructing a system that includes an electronic device (electronic circuit) such as an IC for increasing the output voltage of the fuel cell stack in accordance with the voltage used by an external load using the fuel cell stack as a power supply, there is no need to provide a special substrate for carrying the electric or electronic device inside or outside the fuel cell stack.

In the case of using the single fuel cell 210 independently, the same effect as in the case of the second variation of the fuel stack cell 254 can be produced by forming a circuit pattern on the substrate 214 or 238 of the fuel cell 210.

Further, each conductor layer of the fuel cell of the second embodiment may be composed of two or more divided blocks, and the same may apply to other members of the fuel cell, such as the extension electrodes, as required.

The present invention is not limited to the specifically disclosed embodiments, but variations and modifications may be made without departing from the scope of the present invention.

The present application is based on Japanese priority applications No. 2002-340900, filed on Nov. 25, 2002, and No. 2002-368519, filed on Dec. 19, 2002, the entire contents of which are hereby incorporated by reference.

What is claimed is:

1. A fuel cell, comprising:
a membrane electrode assembly (MEA) including a polymer electrolyte membrane having first and second sides to which a fuel electrode and an air electrode are joined, respectively;
a fuel electrode housing including a fuel channel and a fuel-side electrode film integrally formed on an internal face of the fuel electrode housing; and
an air electrode housing having an air passage formed therein, the air electrode housing including an air-side electrode film integrally formed on an internal face of the air electrode housing,
wherein:
said fuel electrode housing is joined to said MEA with the internal face thereof facing the fuel electrode of said MEA so that the fuel-side electrode film is electrically connected to the fuel electrode; and
said air electrode housing is joined to said MEA with the internal face thereof facing the air electrode of said MEA so that the air-side electrode film is electrically connected to the air electrode.

2. The fuel cell as claimed in claim 1, wherein at least one of the fuel-side electrode film and the air-side electrode film is curved toward a corresponding one of the fuel electrode and the air electrode.

3. The fuel cell as claimed in claim 2, wherein the one of the fuel-side electrode film and the air-side electrode film projects in a center part thereof.

4. The fuel cell as claimed in claim 1, wherein each of the fuel-side electrode film and the air-side electrode film is formed by plating an electroless nickel plating undercoat with gold.

5. The fuel cell as claimed in claim 1, wherein the fuel-side electrode film and the air-side electrode film are formed integrally with said fuel electrode housing and said air electrode housing, respectively, by insert molding.

6. The fuel cell as claimed in claim 1, wherein the fuel-side electrode film and the air-side electrode film are deposited on said fuel electrode housing and said air electrode housing, respectively.

7. The fuel cell as claimed in claim 1, wherein the fuel-side electrode film and the air-side electrode film are formed on said fuel electrode housing and said air electrode housing, respectively, by plating.

8. The fuel cell as claimed in claim 1, wherein the fuel-side electrode film and the air-side electrode film are formed on said fuel electrode housing and said air electrode housing, respectively, by coating.

9. The fuel cell as claimed in claim 1, wherein:
a metal member is formed on at least one of the fuel-side electrode film and the air-side electrode film so as to be in contact with a corresponding one of the fuel electrode and the air electrode; and
the one of the fuel-side electrode film and the air-side electrode film is electrically connected to the corresponding one of the fuel electrode and the air electrode by the contact of said metal member with the corresponding one of the fuel electrode and the air electrode.

10. The fuel cell as claimed in claim 9, wherein said metal member comprises a plurality of projections.

11. The fuel cell as claimed in claim 9, wherein said metal member comprises a metal mesh.

12. The fuel cell as claimed in claim 9, wherein said metal member comprises a plurality of springs.

13. The fuel cell as claimed in claim 1, further comprising a packing provided between an edge part of said fuel electrode housing and an edge part of said air electrode housing,
wherein:
said fuel electrode housing and said air electrode housing are fastened by a fastening member; and
the edge parts of said fuel electrode housing and the air electrode housing are sealed.

14. The fuel cell as claimed in claim 1, wherein an edge part of said fuel electrode housing and an edge part of said air electrode housing are sealed by ultrasonic welding.

15. The fuel cell as claimed in claim 1, wherein a plurality of vent holes are formed in said air electrode housing so as to penetrate through the air-side electrode film.

16. The fuel cell as claimed in claim 1, wherein the fuel channel of said fuel electrode housing is formed of a plurality of fuel supply channels that are formed by dividing a space that is in contact with the fuel electrode of said MEA.

17. The fuel cell as claimed in claim 16, wherein the fuel supply channels have respective openings communicating therewith for receiving fuel.

18. The fuel cell as claimed in claim 1, wherein at least one of said fuel electrode housing, said air electrode housing, the fuel-side electrode film, and the air-side electrode film is formed to have a shape including a curved surface.

19. The fuel cell as claimed in claim 1, wherein the fuel cell is shaped so as to be containable in a vacant space of an apparatus in which the fuel cell is to be mounted.

20. The fuel cell as claimed in claim 1, further comprising a fuel reservoir attached to said fuel electrode housing so as to be detachable therefrom.

21. The fuel cell as claimed in claim 1, further comprising a metal wire provided between an edge part of said fuel electrode housing and an edge part of said air electrode housing so as to be electrically connected to the fuel-side electrode film, wherein the edge parts of said fuel electrode housing and said air electrode housing are sealed by welding.

22. The fuel cell as claimed in claim 21, wherein the metal wire is employed as an extension electrode.

23. The fuel cell as claimed in claim 1, wherein the fuel channel is formed on the fuel-side electrode film in said fuel electrode housing.

24. A fuel cell stack, comprising:

a plurality of fuel cells as set forth in claim 1,
wherein:
each fuel cell has a first extension electrode electrically connected to the fuel-side electrode film of said fuel electrode housing and exposed therefrom through an opening, and a second extension electrode electrically connected to the air-side electrode film of said air electrode housing and exposed therefrom through an opening; and the first extension electrode of a first one of the fuel cells is electrically connected by an engagement member to the second extension electrode of a second one of the fuel cells adjacent to the first one of the fuel cells, the engagement member engaging the openings through which the first and second extension electrodes are exposed, respectively.

* * * * *